United States Patent
Raao et al.

(10) Patent No.: US 12,483,354 B2
(45) Date of Patent: Nov. 25, 2025

(54) LTE CRS RATE MATCHING FOR 5G NR PDSCH RESOURCE MAPPING

(71) Applicant: Apple Inc., Cupertino, CA (US)

(72) Inventors: Balaji Raao, San Diego, CA (US); Jia Tang, San Jose, CA (US); Norbert Neurohr, Unterhaching (DE); Hossam K Shokr, Munich (DE); Nico De Laurentiis, San Diego, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 18/349,591

(22) Filed: Jul. 10, 2023

(65) Prior Publication Data

US 2024/0039658 A1 Feb. 1, 2024

Related U.S. Application Data

(60) Provisional application No. 63/393,553, filed on Jul. 29, 2022.

(51) Int. Cl.
*H04L 1/00* (2006.01)
*H04L 5/00* (2006.01)
*H04L 27/26* (2006.01)

(52) U.S. Cl.
CPC ............ *H04L 1/0067* (2013.01); *H04L 5/005* (2013.01); *H04L 27/261* (2013.01)

(58) Field of Classification Search
None
See application file for complete search history.

(56) References Cited

U.S. PATENT DOCUMENTS

| | | | |
|---|---|---|---|
| 2022/0304039 A1 | 9/2022 | Jiang | |
| 2022/0312452 A1* | 9/2022 | Frenne | ............... H04L 5/005 |
| 2022/0346091 A1* | 10/2022 | Karmoose | ............ H04L 1/0072 |
| 2022/0353026 A1 | 11/2022 | Yeo | |
| 2023/0189034 A1* | 6/2023 | Takeda | .................. H04L 1/0069 |
| | | | 370/329 |
| 2023/0318786 A1 | 10/2023 | Takeda | |

* cited by examiner

*Primary Examiner* — Diane L Lo
(74) *Attorney, Agent, or Firm* — Kowert, Hood, Munyon, Rankin & Goetzel, P.C.

(57) ABSTRACT

This disclosure relates to techniques for performing long term evolution cell specific reference signal rate matching for new radio physical downlink shared channel resource mapping in a wireless communication system. A wireless device may establish a wireless link with a fifth generation new radio cell. Information indicating to perform long term evolution cell specific reference signal rate matching for a physical downlink shared channel for the cell for a long term evolution carrier may be received by the wireless device. A set of rate matching patterns may be selected by the wireless device. Long term evolution cell specific reference signal rate matching for the physical downlink shared channel for the cell may be performed by the wireless device for the long term evolution carrier using the selected set of rate matching patterns.

18 Claims, 20 Drawing Sheets

```
lte_crs_patterns_2_4_tx_lut[num_sc_per_rb][max_lte_crs_re_patterns_per_symbol]=
{{ 001001001001,    0, 010010010010,            0,            0},
 { 010010010010,    0, 100100100100,            0,            0},
 { 100100100100,    0, 001001001001,            0,            0},
 { 001001001000, 000000000001, 010010010000, 000000000010,            0},
 { 010010010000, 000000000010, 100100100000, 000000000100,            0},
 { 100100100000, 000000000100, 001001001000, 000000001001,            0},
 { 001001001000, 000000001001, 010010010000, 000000010010,            0},
 { 010010010000, 000000010010, 100100100000, 000000100100,            0},
 { 100100100000, 000000100100, 001001000000, 000001001001,            0},
 { 001001000000, 000001001001, 010010000000, 000010010010,            0},
 { 010010000000, 000010010010, 100100000000, 000100100100,            0},
 { 100100000000, 000100100100, 001001000000, 001001001001 }}

FIG. 14
``` lte_crs_patterns_1_tx_lut[num_sc_per_rb][max_lte_crs_re_patterns_per_symbol]=
{{{000001000001,    0, 000010000010,    0},
 {000010000010,    0, 000100000100,    0},
 {000100000100,    0, 001000001000,    0},
 {001000001000,    0, 010000010000,    0},
 {010000010000,    0, 100000100000,    0},
 {100000100000,    0, 000001000001,    0},
 {000000000001, 000000000001, 000000000010, 000000000010},
 {000000000010, 000000000010, 000000000100, 000000000100},
 {000000000100, 000000000100, 000000001000, 000000001000},
 {000000001000, 000000001000, 000000010000, 000000010000},
 {000000010000, 000000010000, 000000100000, 000000100000},
 {000000100000, 000000100000,            0, 000001000001}}}

FIG. 15 rb_start_end_lut[num_lte_system_bandwidths][num_contiguous_rbs_around_dc]=
{{{3, 2},
  {8, 6},
  {13, 11},
  {25, 24},
  {38, 36},
  {50, 49}}}

FIG. 16

LTE CRS RATE MATCHING FOR 5G NR PDSCH RESOURCE MAPPING

PRIORITY INFORMATION

This application claims priority to U.S. provisional patent application Ser. No. 63/393,553, entitled "LTE CRS Rate Matching for 5G NR PDSCH Resource Mapping," filed Jul. 29, 2022, which is hereby incorporated by reference in its entirety as though fully and completely set forth herein.

FIELD

The present application relates to wireless communications, and more particularly to systems, apparatuses, and methods for performing LTE CRS rate matching for 5G NR PDSCH resource mapping in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing LTE CRS rate matching for 5G NR PDSCH resource mapping in a wireless communication system.

According to the techniques described herein, it may be possible to use an efficient approach to representing LTE CRS resource element overlap with NR PDSCH resources for a given LTE carrier using four or possibly fewer resource element patterns, which can be applied on a resource block level, to perform LTE CRS rate matching for the NR PDSCH. Such an approach may include splitting the LTE CRS resource element overlap into a region above the LTE DC subcarrier and a region below the LTE DC subcarrier. For each such region, LTE CRS resource elements that cross an NR PDSCH resource block boundary may be grouped into one resource element pattern, and LTE CRS resource elements that do not cross an NR PDSCH resource block boundary may be grouped into one resource element pattern.

Using such an approach, it may be possible to store the various possible sets of resource element patterns for LTE CRS rate matching in one or more lookup tables, and for a wireless device to select a set of resource element patterns for LTE CRS rate matching for a given LTE carrier and NR cell from such a lookup table using LTE carrier information (which may be provided to the wireless device by the NR cell at least for rate matching purposes) as well as NR cell information (which may be provided to the wireless device by the NR cell as part of normal NR cell operation).

Techniques are also described herein for another alternative approach to representing LTE CRS resource element overlap with NR PDSCH resources for a given LTE carrier, which may be described as a resource element level approach. Such an approach may include identifying starting and ending resource elements for the NR cell that overlap with LTE CRS resource elements for the LTE carrier in each of a region below the LTE DC subcarrier and a region above the LTE DC subcarrier, and identifying the resource element step size for LTE CRS resource elements for the LTE carrier.

Such an approach may be stored more compactly than an approach that applies resource element patterns on a resource block level, in some instances, which may be beneficial as providing an area saving for a hardware-based rate matching implementation, at least according to some embodiments. It should also be noted, though, that a framework for applying resource element patterns on a resource block level to perform rate matching may be specified (e.g., in 3GPP technical specifications) for at least some other types of rate matching that could be required for the NR PDSCH, so using such an approach for performing LTE CRS rate matching may be beneficial as providing a more consistent hardware and/or software design for the NR PDSCH rate matching, at least according to some embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 14 illustrates an exemplary possible look up table that could be used when determining LTE CRS rate matching patterns for NR PDSCH resource mapping in a 2 or 4 antenna port configuration, according to some embodiments;

FIG. 15 illustrates an exemplary possible look up table that could be used when determining LTE CRS rate matching patterns for NR PDSCH resource mapping in a 1 antenna port configuration, according to some embodiments;

FIG. 16 illustrates an exemplary possible look up table that could be used when determining start and end resource blocks for use in performing LTE CRS rate matching for NR PDSCH resource mapping, according to some embodiments;

Figure 1:
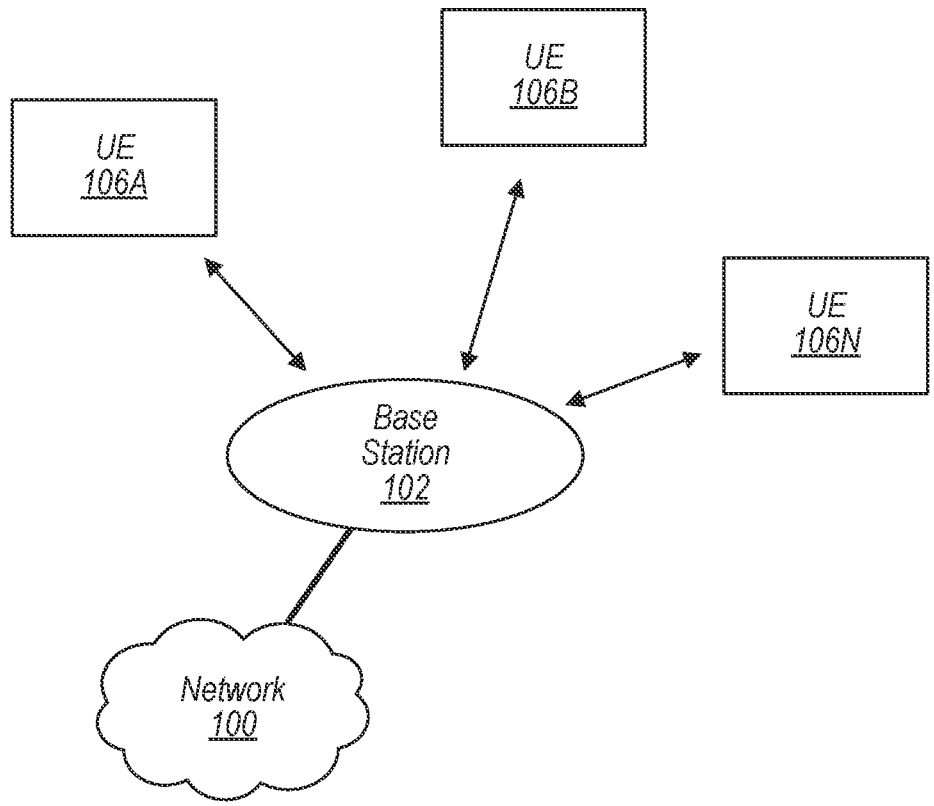
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
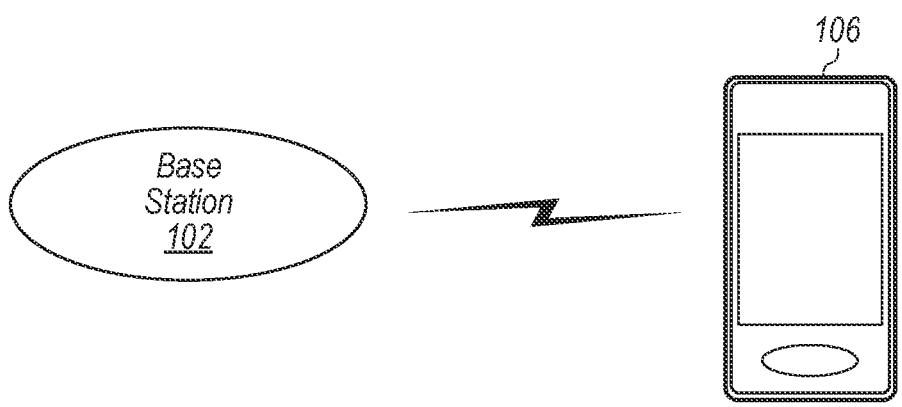
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP NR contexts, base station (gNB) functionality can be split between a centralized unit (CU) and a distributed unit (DU). The illustrated base station 102 may support the functionality of either or both of a CU or a DU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for LTE CRS rate matching for NR PDSCH resource mapping in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
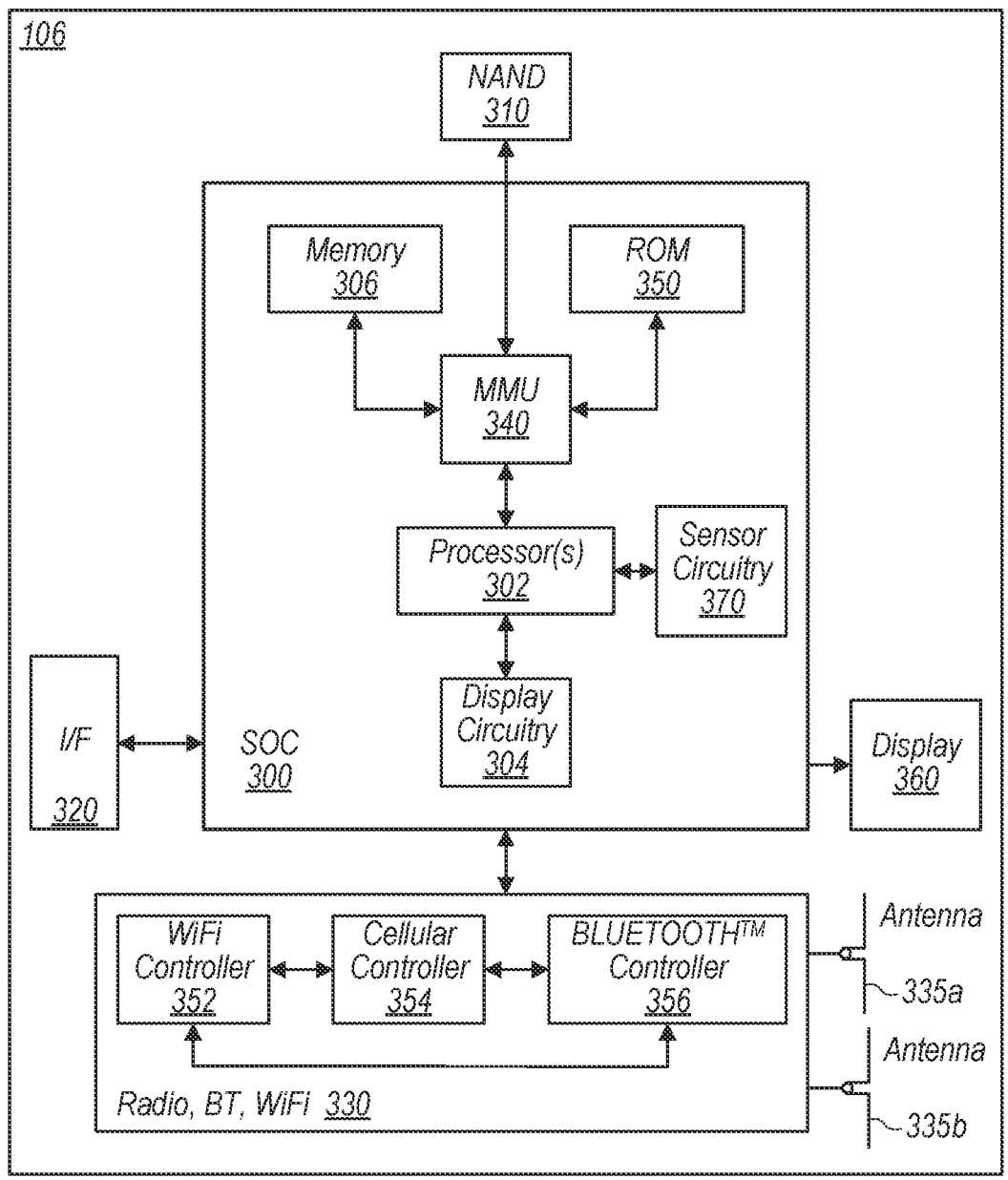
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335*a*), and possibly multiple antennas (e.g., illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for LTE CRS rate matching for NR PDSCH resource mapping in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for LTE CRS rate matching for NR PDSCH resource mapping in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
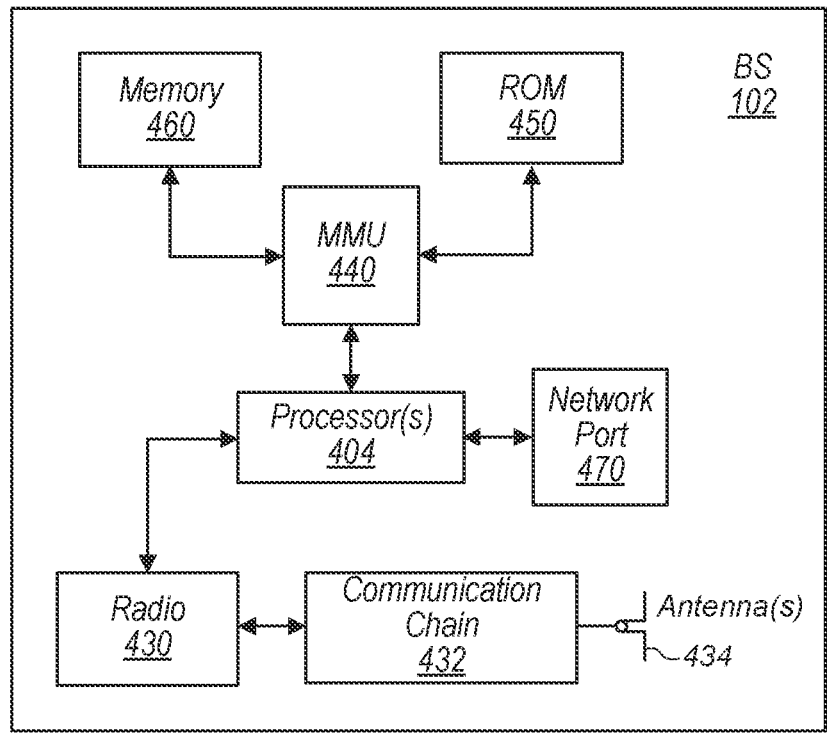
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through MI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the TIE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the preceding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
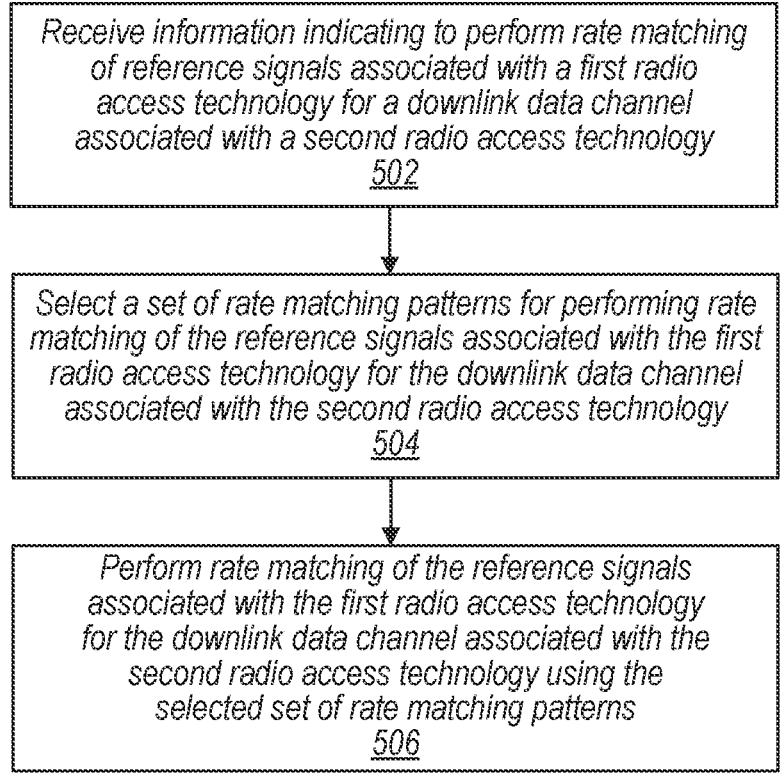
FIG. 5 is a flowchart diagram illustrating aspects of an exemplary possible method for performing LTE CRS rate matching for NR PDSCH resource mapping in a wireless communication system, according to some embodiments.

FIG. 5—LTE CRS Rate Matching for NR PDSCH Resource Mapping

Rate matching or resource mapping in cellular communication systems, such as in 5G NR systems, may include the process of determining which resources allocated for a certain purpose (e.g., a downlink data channel such as a physical downlink shared channel (PDSCH)) actually contain information associated with that purpose. This may include determining whether to exclude (puncture) some resources among the allocated resources that are reserved for other purposes (e.g., for any of various types of reference signals) and unavailable and/or that are not used (e.g., due to a difference between transport block size and the amount of allocated resources) for the purpose for which the rate matching is being performed. Once the rate matching has been performed by a wireless device (e.g., in hardware, software, or a combination thereof), the information contained in the remaining resources allocated for the purpose may be extracted (e.g., demodulated, decoded, etc.) by the wireless device.

Rate matching may be performed to account for various reference signal resources included as part of the same cellular communication system; for example, in a 3GPP NR cell, for the NR physical downlink shared channel (PDSCH), rate matching may be performed for PDSCH demodulation reference signals (DMRS), phase tracking reference signals (PTRS), physical downlink control channel (PDCCH) DMRS, and/or channel state information reference signals (CSI-RS) for the 3GPP NR cell. Scenarios may also be possible in which it is necessary to perform rate matching to account for resources reserved by another cellular communication system sharing part or all of the same frequency spectrum. For example, in a dynamic spectrum sharing (DSS) scenario, it may be possible that spectrum is shared between a 3GPP NR system and a 3GPP LTE system, in which case it may be important to perform rate matching for LTE cell specific reference signals (CRS), e.g., which may be transmitted by the LTE cell even during subframes in which no data communication is scheduled by the LTE cell.

Thus, it may be beneficial to specify techniques for performing LTE CRS rate matching for NR PDSCH resource mapping, at least according to some embodiments. To illustrate one such set of possible techniques, FIG. 5 is a flowchart diagram illustrating aspects of an exemplary possible method for performing LTE CRS rate matching for NR PDSCH resource mapping in a wireless communication system.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with cell provided by a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 502, the wireless device may receive information indicating to perform rate matching of reference signals associated with one ("first") radio access technology (RAT) for a downlink data channel associated with another ("second") RAT. According to some embodiments, the first RAT may be LTE and the second RAT may be NR. For example, the wireless device may be served by a NR cell that shares spectrum with a LTE carrier, and the serving cell of the wireless device may indicate to perform LTE CRS rate matching for the NR carrier. At least in some instances, the NR cell may provide various LTE carrier information for such an LTE carrier, such as information indicating the carrier frequency (e.g., the LTE DC subcarrier frequency) for the LTE carrier, the bandwidth of the LTE carrier, the number of CRS antenna ports of the LTE carrier, a v-Shift parameter indicating if the CRS resource element configuration is shifted in frequency from a default configuration, and possibly (e.g., if applicable) an indication of any sub frames configured as multicast broadcast single frequency network (MBSFN) subframes for the LTE carrier.

Note that it may also be possible that multiple LTE carriers that share spectrum with the NR cell could be configured, in which case the wireless device may be able to determine (e.g., based on the information provided by the NR cell) to perform LTE CRS rate matching for the multiple LTE carriers, if needed. In such a scenario, it may be the case that the wireless device receives LTE carrier information for each such LTE carrier from the serving NR cell, at least according to some embodiments.

In 504, the wireless device may select a set of rate matching patterns for performing rate matching of the reference signals associated with the first RAT for the downlink data channel associated with the second RAT. The set of rate matching patterns may effectively form a representation of the resource overlap between the reference signals associated with the first RAT and the downlink data channel associated with the second RAT, at least in some instances. Thus, the selected set of rate matching patterns may be used to identify and puncture any resources associated with the downlink data channel that are not actually available for the downlink data channel due to their use as reference signals for the first RAT, at least according to some embodiments.

The set of rate matching patterns may be selected based on cell information for a cell that operates according to the first RAT as well as cell information for a cell that operates according to the second RAT. For example, in a scenario in which the first RAT is LTE and the second RAT is NR, the selection of the set of rate matching patterns may be based on the LTE carrier information provided to the wireless device from the serving NR cell, as well as based on cell information for the NR cell, such as information identifying the frequency range (e.g., starting resource block (RB) and size in RBs of the active bandwidth part (BWP) for the wireless device) and subcarrier spacing of the NR cell.

At least according to some embodiments, the set of rate matching patterns may be selected by the wireless device from a lookup table stored by the wireless device. In some instances, the wireless device may store multiple such lookup tables, for example for handling multiple LTE carrier configuration scenarios. Thus, as one possibility, the wireless device could store a lookup table indicating possible sets of LTE CRS rate matching patterns for 1 transmit (TX) antenna LTE CRS configurations and a lookup table indicating possible sets of LTE CRS rate matching patterns for more than 1 TX (e.g., 2 TX or 4 TX) antenna LTE CRS configurations. In such a scenario, the wireless device may determine from which lookup table to select a set of rate matching patterns based at least in part on LTE carrier information indicating the number of LTE CRS TX antenna ports for the LTE carrier, for example such that the lookup table associated with 1 TX antenna port LTE CRS configuration may be used if the LTE carrier information indicates the number of LTE CRS TX antenna ports for the LTE carrier as 1, and the lookup table associated with more than 1 TX antenna port LTE CRS configuration may be used if the LTE carrier information indicates the number of LTE CRS TX antenna ports for the LTE carrier as 2 or 4.

In some embodiments, each such lookup table may include a number of rows equal to the number of subcarriers in an RB and columns equal to a possible number of LTE CRS resource element (RE) patterns per symbol. Thus, a given row index may identify a set of LTE CRS RE patterns that can be applied to various NR PDSCH RBs of the frequency range in which the LTE carrier overlaps with the active NR BWP for the wireless device to perform LTE CRS rate matching for the NR PDSCH for a given combination of LTE carrier and NR cell configurations. In such a scenario, the wireless device may determine a row index from the selected lookup table based at least in part on the LTE carrier information (e.g., using the information indicating the location of the LTE DC subcarrier and the LTE CRS frequency shift parameter v-Shift), and may select the set of LTE CRS RE patterns associated with that row index as the set of rate matching patterns to use to perform the LTE CRS rate matching for the NR PDSCH. Note that it may also be possible for other lookup table configurations (e.g., with the rows and columns transposed, or with different row and/or column arrangements) to be used, potentially with different associated techniques for selecting a set of rate matching patterns from the lookup table(s), according to various embodiments.

At least according to some embodiments, it may be the case that each possible set of LTE CRS rate matching patterns includes four or fewer rate matching patterns, for example u sing a novel technique for representing the LTE CRS RE overlap with the NR PDSCH described herein. Each of the possible rate matching patterns in a set of rate matching patterns may be applied to a different range of RB s of the NR system bandwidth, in such a scenario; the wireless device may accordingly determine the range of RB s to which to apply each of the rate matching patterns in the selected set of rate matching patterns. At least according to some embodiments, according to such an approach, a first LTE CRS rate matching pattern of the set of LTE CRS rate matching patterns may be applied (if needed) in a range from the lowest frequency RB of the PDSCH that includes one or more REs that overlap with one or more LTE CRS REs for the LTE carrier through the RB of the PDSCH adjacent to and lower in frequency than the RB of the PDSCH that overlaps with a DC subcarrier of the LTE carrier. A second LTE CRS rate matching pattern of the set of LTE CRS rate matching patterns may be applied (if needed) in a range from the lowest frequency RB of the PDSCH that includes one or more REs that overlap with one or more LTE CRS REs for the LTE carrier through the RB of the PDSCH that overlaps with the DC subcarrier of the LTE carrier. A third LTE CRS rate matching pattern of the set of LTE CRS rate matching patterns may be applied (if needed) in a range from the RB of the PDSCH that overlaps with the DC subcarrier of the LTE carrier through the highest frequency RB of the PDSCH that includes one or more REs that overlap with one or more LTE CRS REs for the LTE carrier. A fourth LTE CRS rate matching pattern of the first set of LTE CRS rate matching patterns may be applied (if needed) in a range from the RB of the PDSCH adjacent to and higher in frequency than the RB of the PDSCH that overlaps with the DC subcarrier of the LTE carrier through the highest frequency RB of the PDSCH that includes one or more REs that overlap with one or more LTE CRS REs for the LTE carrier.

Note that the RB of the PDSCH that overlaps with the DC subcarrier of the LTE carrier, the lowest frequency RB of the PDSCH that includes one or more REs that overlap with one or more LTE CRS REs for the LTE carrier, and the highest frequency RB of the PDSCH that includes one or more REs that overlap with one or more LTE CRS REs for the LTE carrier, may all be determined based at least in part on LTE carrier information for the LTE carrier, at least according to some embodiments. For example, the wireless device may determine the range of RBs of the PDSCH that overlap with the LTE CRS REs for the LTE carrier based on LTE carrier system bandwidth information and LTE DC subcarrier location information. As one such possibility, the wireless device may store a lookup table configured for use for identifying the starting and ending RBs of a range of RBs that include overlap with LTE CRS REs based on the LTE carrier system bandwidth information and LTE DC subcarrier location information, and may use the lookup table together with the LTE carrier information to determine the range of RBs of the PDSCH that overlap with the LTE CRS REs for the LTE carrier.

Thus, such an approach may include one or two patterns for representing the LTE CRS RE overlap with the NR PDSCH in the region below the LTE DC subcarrier in frequency, and one or two patterns for representing the LTE CRS RE overlap with the NR PDSCH in the region above the LTE DC subcarrier in frequency. One of the possible patterns for representing the LTE CRS RE overlap with the NR PDSCH in the region below the LTE DC subcarrier may identify LTE CRS RE subcarriers below the LTE DC subcarrier and within the boundaries of the NR RB that overlaps with the LTE DC subcarrier. The other possible pattern for representing the LTE CRS RE overlap with the NR PDSCH in the region below the LTE DC subcarrier may identify any remaining LTE CRS RE subcarriers in the same LTE RB that are beyond the boundaries of the NR RB that overlaps with the LTE DC subcarrier. Similarly, one of the possible patterns for representing the LTE CRS RE overlap with the NR PDSCH in the region above the LTE DC subcarrier may identify LTE CRS RE subcarriers above the LTE DC subcarrier and within the boundaries of the NR RB that overlaps with the LTE DC subcarrier. The other possible pattern for representing the LTE CRS RE overlap with the NR PDSCH in the region above the LTE DC subcarrier may identify any remaining LTE CRS RE subcarriers in the same LTE RB that are beyond the boundaries of the NR RB that overlaps with the LTE DC subcarrier. Depending on the location of the LTE DC subcarrier in the NR RB that overlaps with the LTE DC subcarrier and the frequency shift value for LTE CRS REs, it may be possible that only one of the possible patterns is needed to represent the LTE CRS RE overlap with the NR PDSCH in one or both of the regions, which could lead to fewer than four LTE CRS RE patterns being needed to perform the LTE CRS rate matching. To account for such scenarios, it may be the case that certain entries in one or more of the rate matching lookup tables include a value of 0, which may indicate that the set of rate matching patterns for that row of the rate matching lookup table includes fewer than four rate matching patterns.

Note that there may also be scenarios in which multiple sets of LTE CRS RE patterns are selected for a single LTE carrier. For example, in a 1 TX antenna port LTE CRS configuration scenario, it may be the case that the LTE CRS REs are offset in certain orthogonal frequency division multiplexing (OFDM) symbols (e.g., symbols 4 and 11 of each LTE subframe) relative to other OFDM symbols (e.g., symbols 0 and 7 of each LTE subframe). In such a scenario, it may be the case that one set of LTE CRS RE patterns is selected for one set of OFDM symbols, and another set of LTE CRS RE patterns is selected for another set of OFDM symbols.

Note that there may be scenarios in which one or more of the selected LTE CRS RE patterns may be pruned for certain PDSCH RBs; for example, it may be the case that such pruning is needed for the highest frequency RB of the NR PDSCH that includes one or more REs that overlap with one or more LTE CRS REs for the LTE carrier and/or for the lowest frequency RB of the NR PDSCH that includes one or more REs that overlap with one or more LTE CRS REs for the LTE carrier. In such a scenario, depending on the end of LTE RB containing LTE CRS REs that overlap with NR PDSCH RB (e.g., denoted in terms of a subcarrier index whose values range from 0 to 11), non-overlapping LTE CRS REs may be pruned away from the selected LTE CRS RE patterns for the highest frequency RB of the PDSCH and the lowest frequency RB of the PDSCH respectively. The pruning operation may be done at the time of performing rate matching using LTE CRS RE patterns for the highest frequency RB of the PDSCH and for the lowest frequency RB of the PDSCH, at least according to some embodiments, which may avoid a possible extra step of storing the intermediate results from the pruning operation. In the pruning operation, the highest frequency RB of the PDSCH may have REs higher in frequency than the end of LTE CRS RE (e.g., at the higher frequency bound of the LTE CRS REs) pruned away in the selected LTE CRS RE pattern(s). Similarly, the lowest frequency RB of the PDSCH may have REs lower in frequency than the end of LTE CRS RE (e.g., at the lower frequency bound of the LTE CRS REs) pruned away in the selected LTE CRS RE pattern(s). The UE may then use the pruned LTE CRS RE patterns for rate-matching of the highest frequency RB of the PDSCH and the lowest frequency RB of the PDSCH. It may be the case that the end of LTE CRS overlap (e.g., at each of the lower frequency bound and the higher frequency bound) can be determined by the wireless device based at least in part on the LTE system bandwidth, the LTE DC subcarrier location, and the NR RB containing NR PDSCH allocation that overlaps with the LTE DC subcarrier, at least according to some embodiments.

In 506, the wireless device may perform rate matching of the reference signals associated with the first RAT for the downlink data channel associated with the second RAT using the selected set of rate matching patterns. Note that this rate matching may be performed only in certain time windows (e.g., orthogonal frequency division multiplexing (OFDM) symbols) in which the reference signals associated with the first RAT are present. At least in some instances, this may depend at least in part on the number of TX antenna ports for the reference signals associated with the first RAT. For example, LTE CRS REs may be present in a different set of OFDM symbols for a 2 TX antenna port LTE CRS configuration (e.g., symbols 0, 4, 7, 11) than for a 4 TX antenna port LTE CRS configuration (e.g., symbols 0, 1, 4, 7, 8, 11). As noted previously herein, for a 1 TX antenna port LTE CRS configuration, it may be the case that different sets of LTE CRS RE patterns are used when performing rate matching during different OFDM symbols. In some instances, the time windows in which the rate matching is performed may also depend at least in part on whether a MBSFN subframe is configured for the LTE carrier; for example, if a MBSFN subframe is configured for the LTE carrier, it may be the case that LTE CRS are absent from symbols 2-13 of the subframe, in which case it may be possible to perform the LTE CRS rate matching for only symbol 0 and possibly symbol 1 (e.g., depending on the LTE CRS antenna port configuration). Thus, at least according to some embodiments, it may be the case that the wireless device determines in which OFDM symbols to perform LTE CRS rate matching for the PDSCH for a 5G NR cell for a given LTE carrier based at least in part on the number of LTE CRS antenna ports for the LTE carrier and/or the MBSFN configuration for the LTE carrier, and may perform the LTE CRS rate matching for the PDSCH in those determined OFDM symbols.

As previously noted, in some instances it may be possible that multiple LTE carriers are active in the same bandwidth range used by a NR cell. In such a scenario (which may be referred to/defined as a multi-TRP scenario), it may be possible that the wireless device additionally receives information indicating to perform LTE CRS rate matching for the PDSCH for the NR cell for any such additional LTE carriers. The wireless device may select a set of LTE CRS rate matching patterns for each such LTE carrier in a similar manner (e.g., using one or more lookup tables, based on LTE carrier information for the LTE carrier and cell information for the NR cell), with each such set of LTE CRS rate matching patterns potentially also including four or fewer LTE CRS rate matching patterns. The wireless device may further perform LTE CRS rate matching for the PDSCH for the NR cell for each of the additional LTE carriers using the selected set(s) of LTE CRS rate matching patterns, again in a similar manner as described herein for a single LTE carrier, at least according to some embodiments.

In some instances, it may be possible that the wireless device can use an alternative representation of the LTE CRS RE overlap with the NR PDSCH for a LTE carrier for LTE CRS rate matching for the NR PDSCH. For example, where use of a set of LTE CRS RE patterns that are each applied to a different range of RBs may be considered a "RB-level" approach, an alternative "RE-level" approach may also be possible and potentially may provide a more compact representation of the LTE CRS RE overlap with the NR PDSCH.

According to some embodiments, such a RE-level representation of which REs of the PDSCH allocation for a NR cell overlap with LTE CRS REs may identify the start and end of each of a frequency range in which such overlap is present below and above the LTE DC subcarrier. For example, the representation may include resource block index and subcarrier index information for each of the start of the frequency range below the LTE DC subcarrier, the end of the frequency range below the LTE DC subcarrier, the start of the frequency range above the LTE DC subcarrier, and the end of the frequency range above the LTE DC subcarrier.

The RE-level representation of which REs of the PDSCH allocation for the NR cell overlap with LTE CRS REs may further include an indication of a RE step size for LTE CRS REs in the frequency range below the LTE DC subcarrier and in the frequency range above the LTE DC subcarrier, at least according to some embodiments. For example, the indication of the RE step size could indicate whether a LTE CRS RE is present once in every three REs, or once in every six REs, in each frequency range and symbol in which LTE CRS REs are present. Similar to an RB-level representation based approach, the wireless device may be able to determine the parameters of the RE-level representation of the overlap of LTE CRS REs with the NR PDSCH, as well as in which OFDM symbols to apply the rate matching, based on LTE carrier information for the LTE carrier, such as the number of LTE CRS antenna ports, the location of the DC subcarrier for the LTE carrier, the system bandwidth for the LTE carrier, the frequency shift for the LTE CRS pattern for the LTE carrier, and possibly the MBSFN subframe configuration for the LTE carrier.

Thus, at least according to some embodiments, the method of FIG. 5 may be used to provide a framework according to which a wireless device can efficiently perform LTE CRS rate matching for NR PDSCH resource mapping, and thus to reduce the PPA (Power Performance Area) requirements for the wireless device to perform the rate matching and/or facilitate support for additional resource element patterns for other rate matching aspects, at least in some instances.

FIGS. 6-19 and Additional Information

FIGS. 6-19 illustrate further aspects that might be used in conjunction with the method of FIG. 5 if desired. It should be noted, however, that the exemplary details illustrated in and described with respect to FIGS. 6-19 are not intended to be limiting to the disclosure as a whole: numerous variations and alternatives to the details provided herein below are possible and should be considered within the scope of the disclosure.

In some 5G NR deployment scenarios, such as at least some dynamic spectrum sharing (DSS) scenarios, it may be possible that rate matching for the NR PDSCH allocated resources needs to account for LTE CRS resource elements (REs). Note that the terms "NR" and "5G NR" may be used interchangeably for the purpose of this disclosure. Various possible techniques and algorithms that can be used for such rate matching of LTE CRS REs around NR PDSCH allocated REs by a 5G NR UE prior to data demodulation by the UE are accordingly presented herein. The techniques may include determining a set of LTE CRS RE patterns for the LTE CRS configuration configured from the network for rate matching around the NR PDSCH allocation. At least in some instances, it may be possible to use the techniques described herein to compute LTE CRS RE patterns in a 5G NR UE that supports 3GPP Release 15 and 16 for LTE and NR co-existence including multi-TRP requirement. The techniques described herein, and/or variations thereon, may additionally or alternatively be used in other 3GPP Release versions and/or in other wireless communication systems, at least according to some embodiments. Techniques for utilizing a compact representation to store overlapping information for LTE CRS REs around NR PDSCH allocated REs in a 5G NR UE are also described herein.

In 3GPP Release 15, the "RateMatchPatternLTE-CRS" RRC information element may be used to provide information about one LTE carrier in a serving cell to a 5G NR UE. According to some embodiments, the information may include the LTE CRS frequency shift, which may be identified as "v-Shift", the number of LTE CRS antenna ports (e.g., 1, 2, or 4 ports), which may be identified as "nrofCRS-Ports," the LTE carrier's downlink system bandwidth, which may be identified as "carrierBandwidthDL," the LTE carrier's DC subcarrier location, which may be identified as "carrierFreqDL," and which may be represented as an offset in units of 15 kHz subcarriers from the NR carrier's reference point A, and/or possibly (e.g., if applicable) the multicast broadcast single frequency network (MBSFN) subframe configuration, which may be identified as "mbsfn-SubframeConfigList."

Knowledge of LTE CRS RE locations can be derived from 3GPP TS 36.211 v.17.2.0 section 6.10.1.2 and from this information, such that different overlap patterns of LTE CRS REs with NR PDSCH REs in allocated NR PDSCH RBs can be identified. From these overlap patterns, it may be possible to derive LTE CRS RE patterns for use in rate matching in a variety of ways, some of which may result in a different maximum number of LTE CRS RE patterns needed to perform the rate matching than others. One approach for such derivation with 5 as the maximum number of LTE CRS RE patterns needed to perform the rate matching is described herein, as well as a more efficient approach with 4 as the maximum number of LTE CRS RE patterns needed to perform the rate matching. In addition, an alternative (e.g., to a pattern-based approach) manner of representing LTE CRS overlap information with NR PDSCH, which may reduce the number of bits used to store the overlap information in a 5G NR UE, is described herein.

Figure 6:
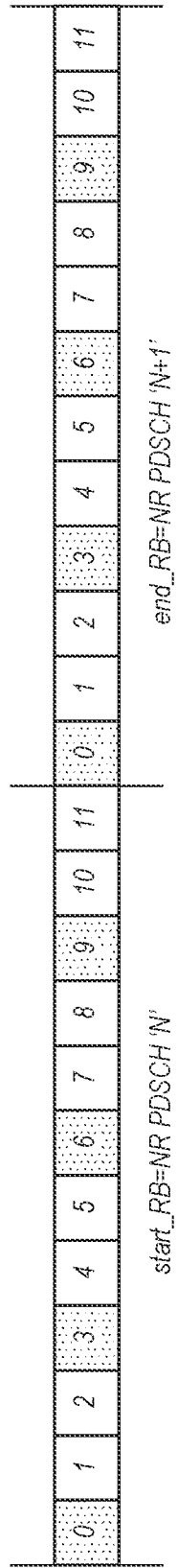
FIG. 6 illustrates an example pattern framework that can be used in conjunction with rate matching for NR PDSCH resource mapping, according to some embodiments.

For techniques that utilize the concept of a pattern to apply rate matching for NR PDSCH resources, FIG. 6 illustrates possible example aspects of such a pattern framework. In the illustrated example, a pattern may be defined as a bitmap of length 12 bits that represents 12 REs in a resource block (RB) within an active bandwidth part (BWP) or bandwidth of a serving cell (e.g., in LTE or NR). Bits that are set in a pattern define the pattern. Note that the terms "pattern" and "RE pattern" may be used interchangeably for the purpose of this disclosure. If a pattern is applicable to multiple RBs within an active BWP or bandwidth of a serving cell, additional attributes such as "start_rb" (e.g., the first RB to which a pattern is applicable), "end_rb" (e.g., the last RB to which a pattern is applicable), and pattern periodicity in terms of RBs (e.g., how frequently the pattern is applicable from start_rb to end_rb) may be represented for the pattern. In the illustrated example (and in other pattern representations illustrated in the various Figures herein), a pattern of 12 bits may be represented in little-Endian format. Thus, BIT0 may correspond to RE0 in an RB, BIT1 may correspond to RE1 in an RB, and so on, through BIT11 corresponding to RE11 in an RB. In the illustrated example of FIG. 6, the pattern spans two RBs, hence start_rb and end_rb appear consecutively, and the pattern periodicity is set as every RB.

Figure 7:
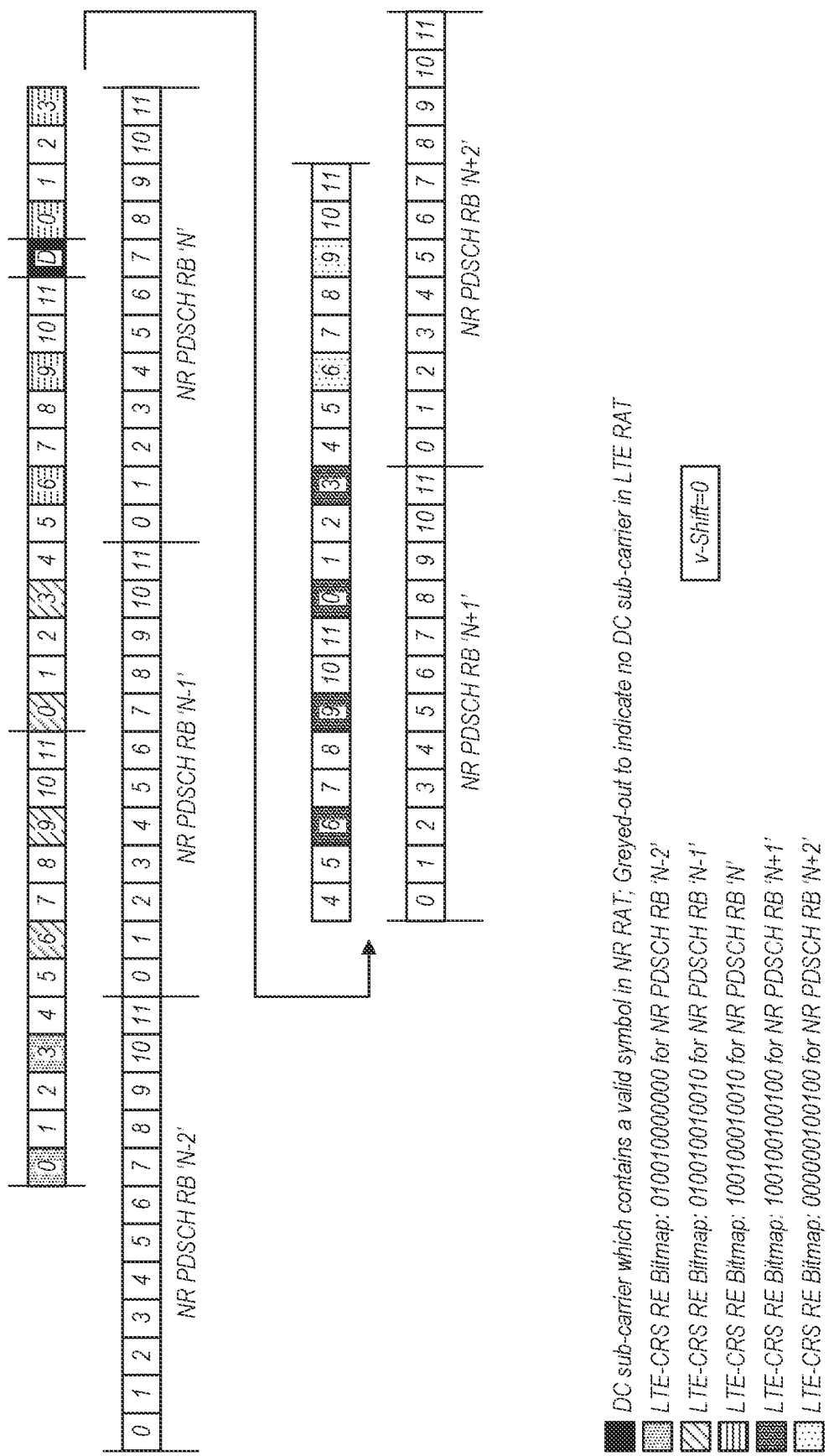
FIG. 7 illustrates aspects of an exemplary possible approach to performing LTE CRS rate matching for NR PDSCH resource mapping using five patterns, according to some embodiments.

As previously noted herein, one approach for derivation of LTE CRS RE bitmap patterns could result in 5 as the maximum number of LTE CRS RE patterns needed to perform rate matching for allocated NR PDSCH resources. FIG. 7 illustrates exemplary possible aspects of such an approach, according to some embodiments. In particular, FIG. 7 illustrates a set of 5 LTE CRS RE patterns of 12 bits in length with 2 or 4 TX antenna ports in a given orthogonal frequency division multiplexing (OFDM) symbol for v-Shift=0 overlapping with NR PDSCH allocated RBs around the LTE carrier's DC subcarrier. The NR PDSCH RB "N" may be the RB that overlaps with the LTE carrier's DC subcarrier (which is denoted as "D"). The LTE DC subcarrier may be derived using carrierFreqDL and mapped to a RE location within a NR active BWP in which the NR PDSCH is scheduled. According to the illustrated approach, the RB "N" is shown to have one RE pattern of its own. NR PDSCH RB "N−2" may represent the start_rb of the PDSCH allocation that overlaps with an LTE RB containing LTE CRS in a slot, and is shown to have a separate RE pattern of its own. Similarly, NR PDSCH RB "N+2" may represent the end_rb of the PDSCH allocation that overlaps with an LTE RB containing LTE CRS within a slot, and is shown to have a separate RE pattern of its own. Further, NR PDSCH RB "N−1" may represent all RBs that are present between start_rb and RB "N" within a slot and that have one common RE pattern. Similarly, NR PDSCH RB "N+1" may represent all RBs that are present between RB "N" and end_rb within a slot and that have one common RE pattern.

Figure 8:
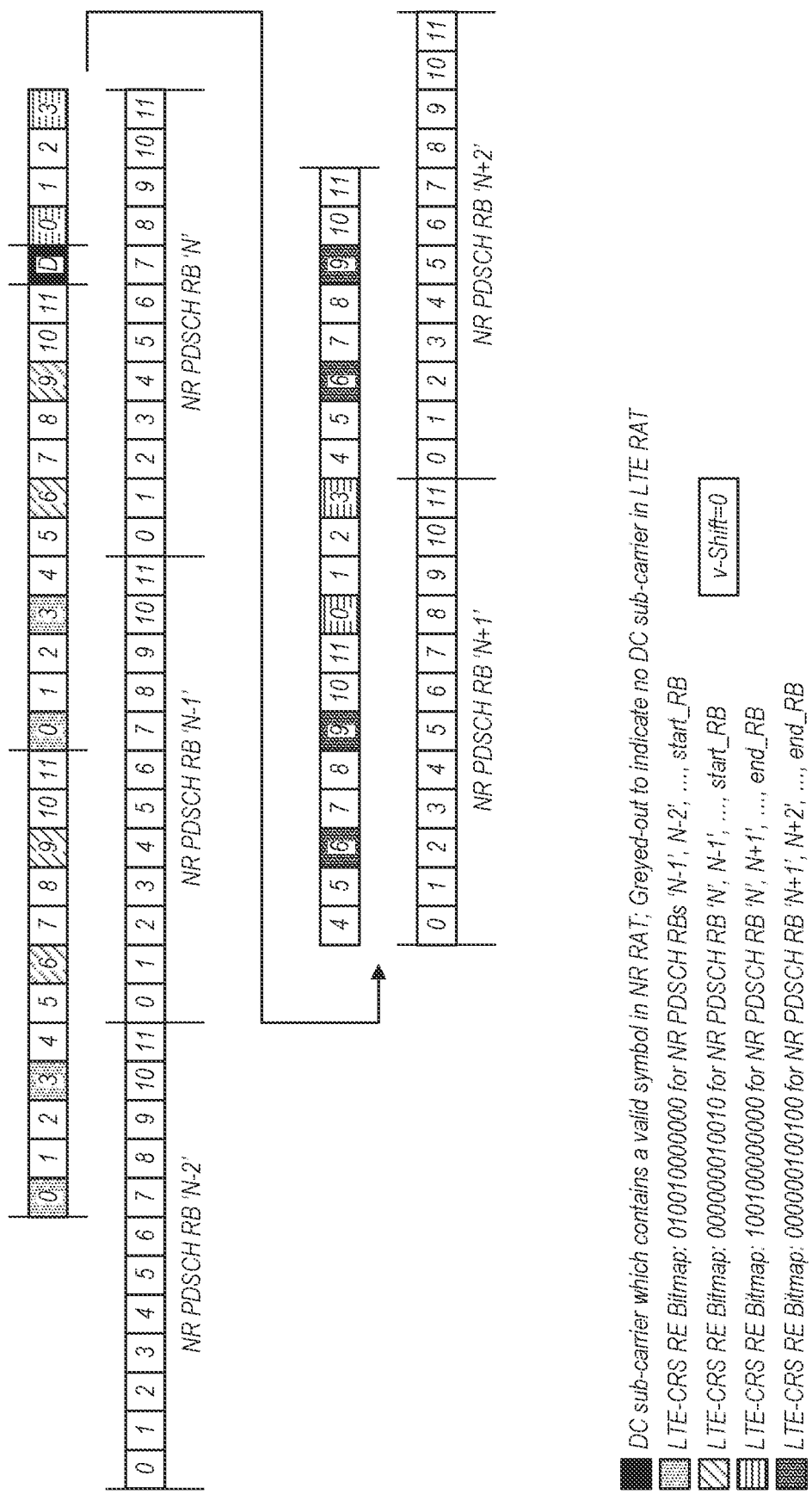
FIGS. 8-11 illustrate example scenarios for a possible approach to performing LTE CRS rate matching for NR PDSCH resource mapping with up to four patterns for a 2 or 4 antenna port configuration, according to some embodiments.

An alternative approach for derivation of LTE CRS RE bitmap patterns could result in four as the maximum number of LTE CRS RE patterns needed to perform rate matching for allocated NR PDSCH resources. FIG. 8 illustrates exemplary possible aspects of such an approach, according to some embodiments. In particular, FIG. 8 illustrates a set of four LTE CRS RE patterns of 12 bits in length considering an example of 2 or 4 TX antenna ports in a given OFDM symbol for v-shift=0 overlapping with NR PDSCH allocated RBs around the LTE carrier's DC subcarrier. Note that the LTE CRS REs in FIG. 7 and FIG. 8 overlap identically with the NR PDSCH allocated RBs around the LTE carrier's DC subcarrier, but because a different approach to deriving the LTE CRS RE bitmap patterns is used in FIG. 8, only 4 patterns are needed (e.g., instead of 5) to represent the LTE CRS RE overlap with the NR PDSCH allocated RBs around the LTE carrier's DC subcarrier.

In the approach of FIG. 8, the representation of the overlap is split into two levels—below and above the LTE DC subcarrier denoted as "D". Within each level, LTE CRS REs that cross a NR PDSCH RB boundary are grouped as one RE pattern and LTE CRS REs that do not cross a NR PDSCH RB boundary are grouped as another RE pattern. This approach results in two RE patterns per level, which are applicable for multiple NR PDSCH RBs. By including all RBs below and above the LTE DC subcarrier, the total number of LTE CRS RE patterns may be four patterns. Note that the LTE CRS RE patterns may have a periodicity of every RB and the range for each pattern (e.g., in terms of start_rb, end_rb, and "N" (where "N" denotes the NR PDSCH RB that overlaps with the LTE DC subcarrier) is also indicated in the example scenario illustrated in FIG. 8.

Figure 9:
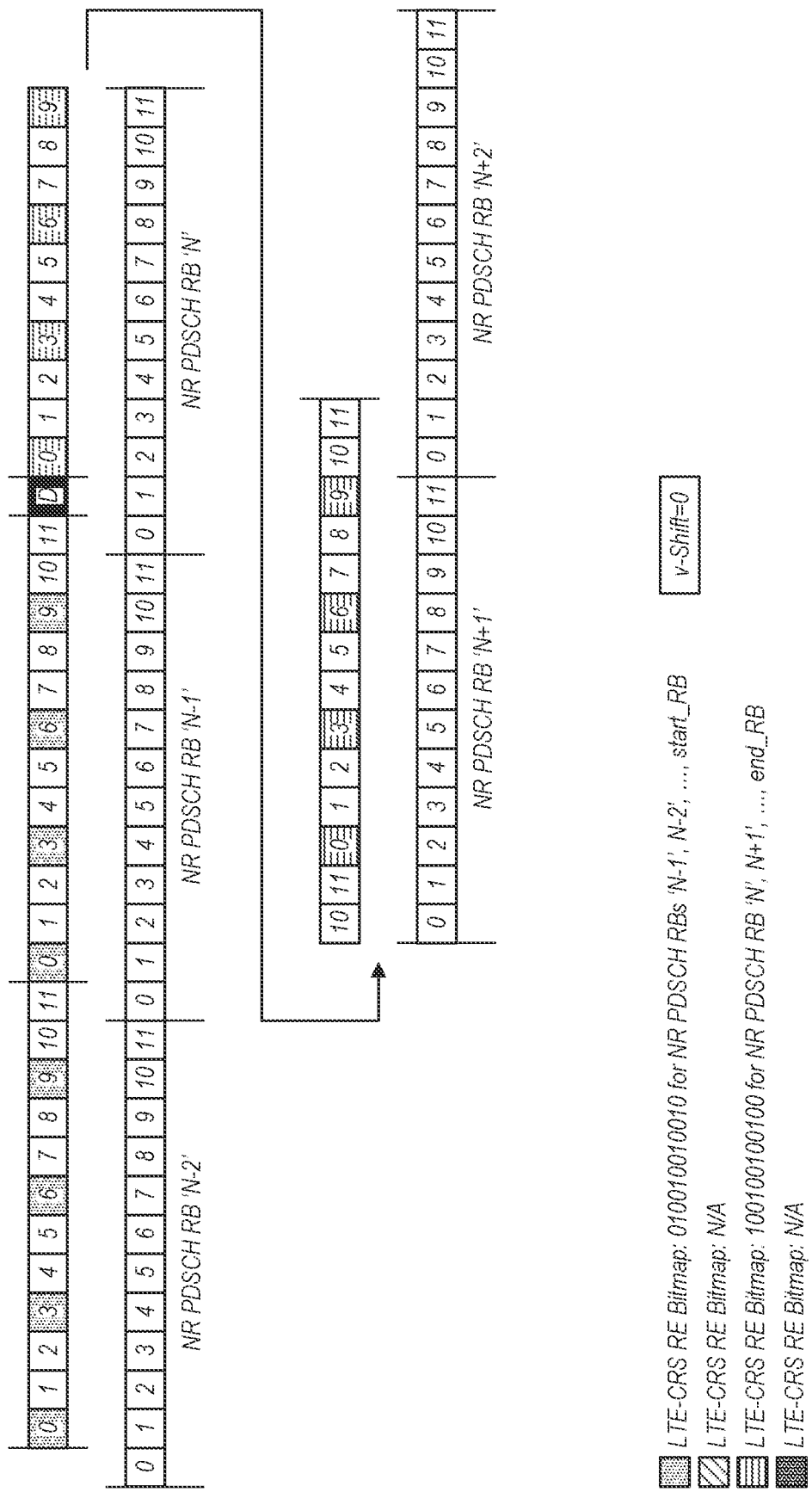
Figure 10:
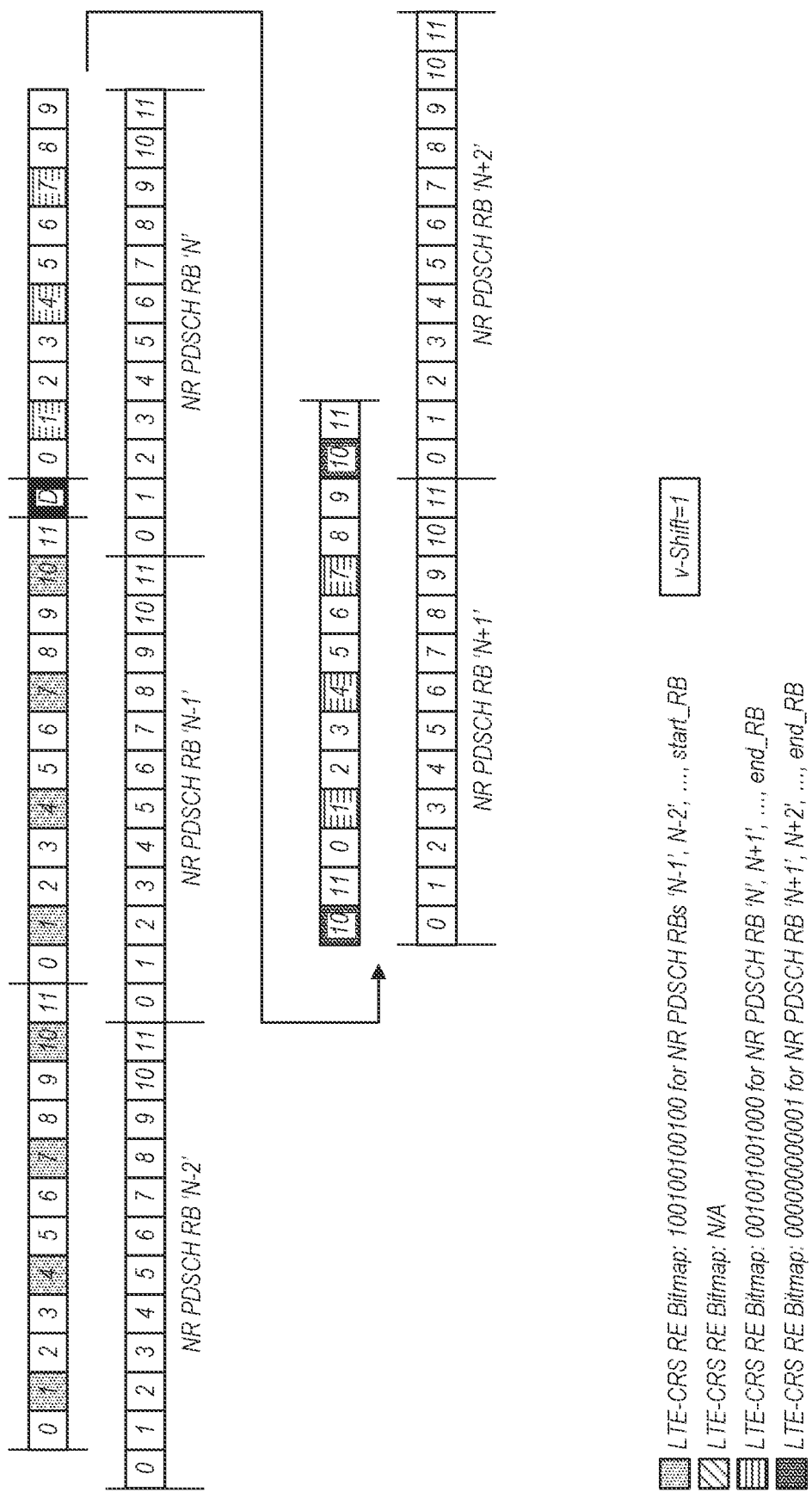
Figure 11:
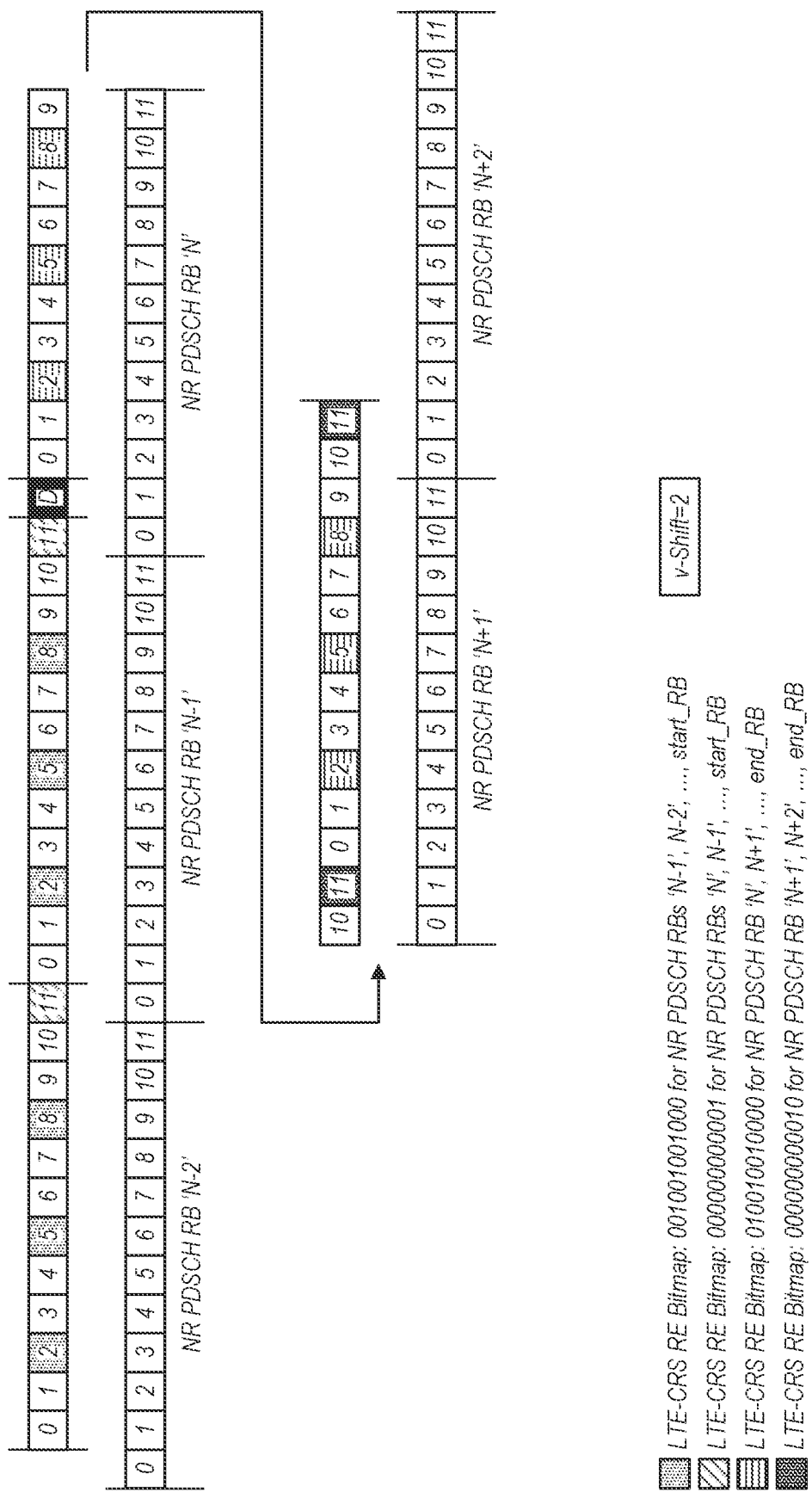

In some scenarios, for a particular v-Shift and LTE DC subcarrier location, it may happen that all LTE CRS REs would be contained within an NR PDSCH RB boundary in either or both of the set of RBs that are below or above the LTE DC subcarrier. This can lead to a number of LTE CRS RE patterns that is less than four patterns. In other words, there could be either two LTE CRS RE patterns or three LTE CRS RE patterns to represent the LTE CRS RE overlap with the NR PDSCH allocated RBs around the LTE carrier's DC subcarrier in some scenarios. FIG. 9 illustrates one possible example of a scenario in which it may be possible that two LTE CRS RE patterns are used per OFDM symbol, while FIG. 10 illustrates one possible example of a scenario in which it may be possible that three LTE CRS RE patterns are used per OFDM symbol. FIG. 11 illustrates another possible example of a scenario in which four LTE CRS RE patterns are used per OFDM symbol. FIGS. 9-11 illustrate these sets of two to four LTE CRS RE patterns considering three examples of 2 or 4 TX antenna ports in a given OFDM symbol for different v-Shift values={0, 1, 2} overlapping with NR PDSCH allocated RBs around the LTE carrier's DC subcarrier.

As shown in FIG. 9, for v-Shift={0}, all LTE CRS REs would be contained within an NR PDSCH RB boundary in both levels—below and above the LTE DC subcarrier denoted as "D". This leads to two LTE CRS RE patterns per OFDM symbol and per NR slot, in the illustrated scenario. The two LTE CRS RE patterns are shaded differently and the pattern bitmaps and applicability of pattern bitmaps for NR PDSCH allocated RBs are also illustrated. It may be noted that the two LTE CRS RE patterns may have a pattern periodicity of every RB and the range for each pattern (e.g., in terms of start_rb, end_rb, and "N" (where "N" denotes the NR PDSCH RB that overlaps with the LTE DC subcarrier) is also indicated in the example scenario illustrated in FIG. 9.

As shown in FIG. 10, for v-Shift={1}, LTE CRS RE10 in the set of RBs above the LTE DC subcarrier crosses the NR PDSCH RB boundary. This leads to three LTE CRS RE patterns per OFDM symbol and per NR slot, in the illustrated scenario. The three LTE CRS RE patterns are shaded differently and the pattern bitmaps and applicability of pattern bitmaps for NR PDSCH allocated RBs are also illustrated. It may be noted that the three LTE CRS RE patterns may have a pattern periodicity of every RB and the range for each pattern (e.g., in terms of start_rb, end_rb, and "N" (where "N" denotes the NR PDSCH RB that overlaps with the LTE DC subcarrier) is also indicated in the example scenario illustrated in FIG. 10.

As shown in FIG. 11, for v-Shift={2}, LTE CRS RE11 in the sets of RBs both below and above the LTE DC subcarrier cross the NR PDSCH RB boundary. This leads to four LTE CRS RE patterns per OFDM symbol and per NR slot, in the illustrated scenario. The four LTE CRS RE patterns are shaded differently and the pattern bitmaps and applicability of pattern bitmaps for NR PDSCH allocated RBs are also illustrated. It may be noted that the four LTE CRS RE patterns may have a pattern periodicity of every RB and the range for each pattern (e.g., in terms of start_rb, end_rb, and "N" (where "N" denotes the NR PDSCH RB that overlaps with the LTE DC subcarrier) is also indicated in the example scenario illustrated in FIG. 11.

Figure 12:
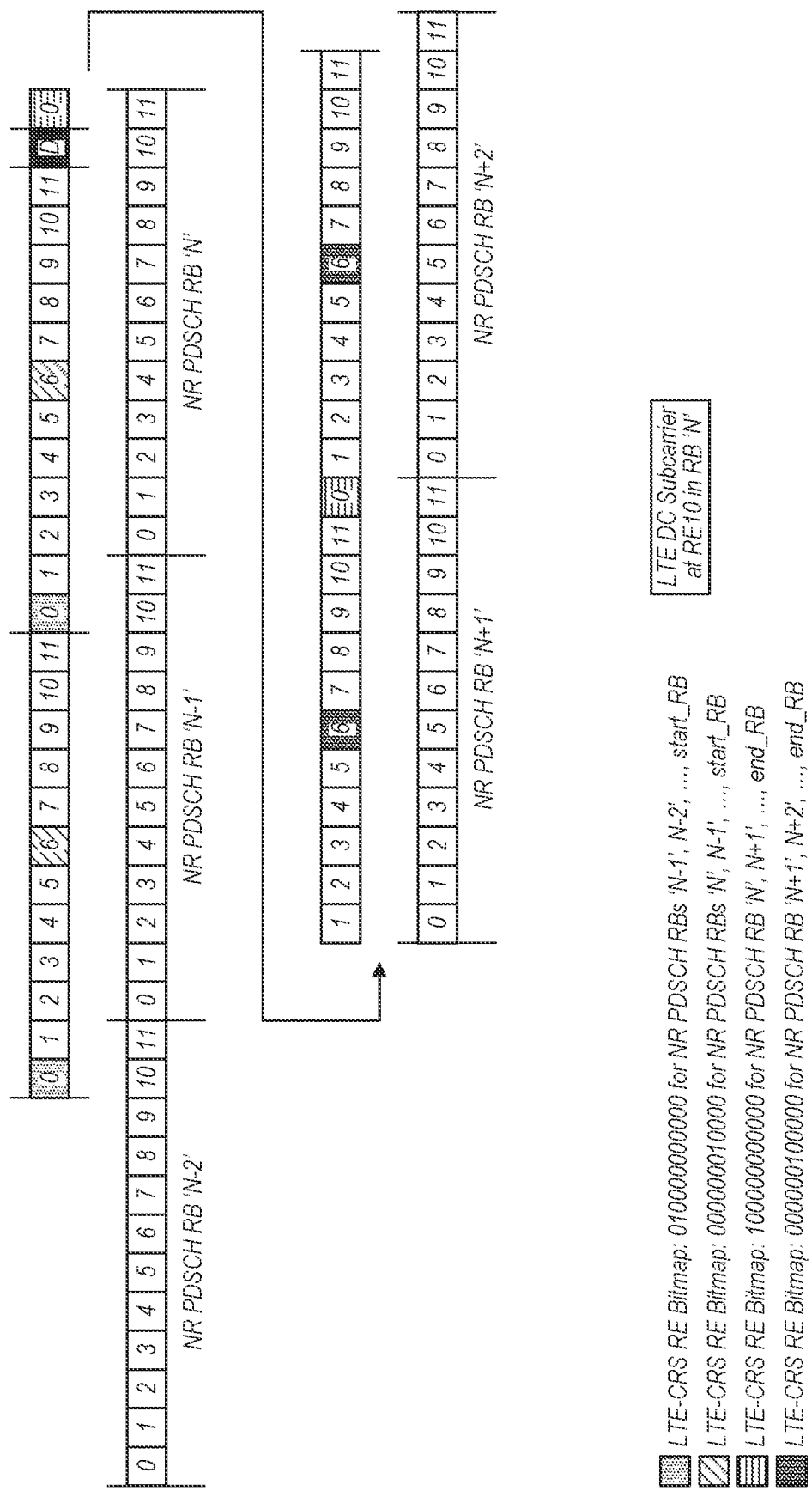
FIGS. 12-13 illustrate example scenarios for a possible approach to performing LTE CRS rate matching for NR PDSCH resource mapping with up to four patterns for a 1 antenna port configuration, according to some embodiments.
Figure 13:
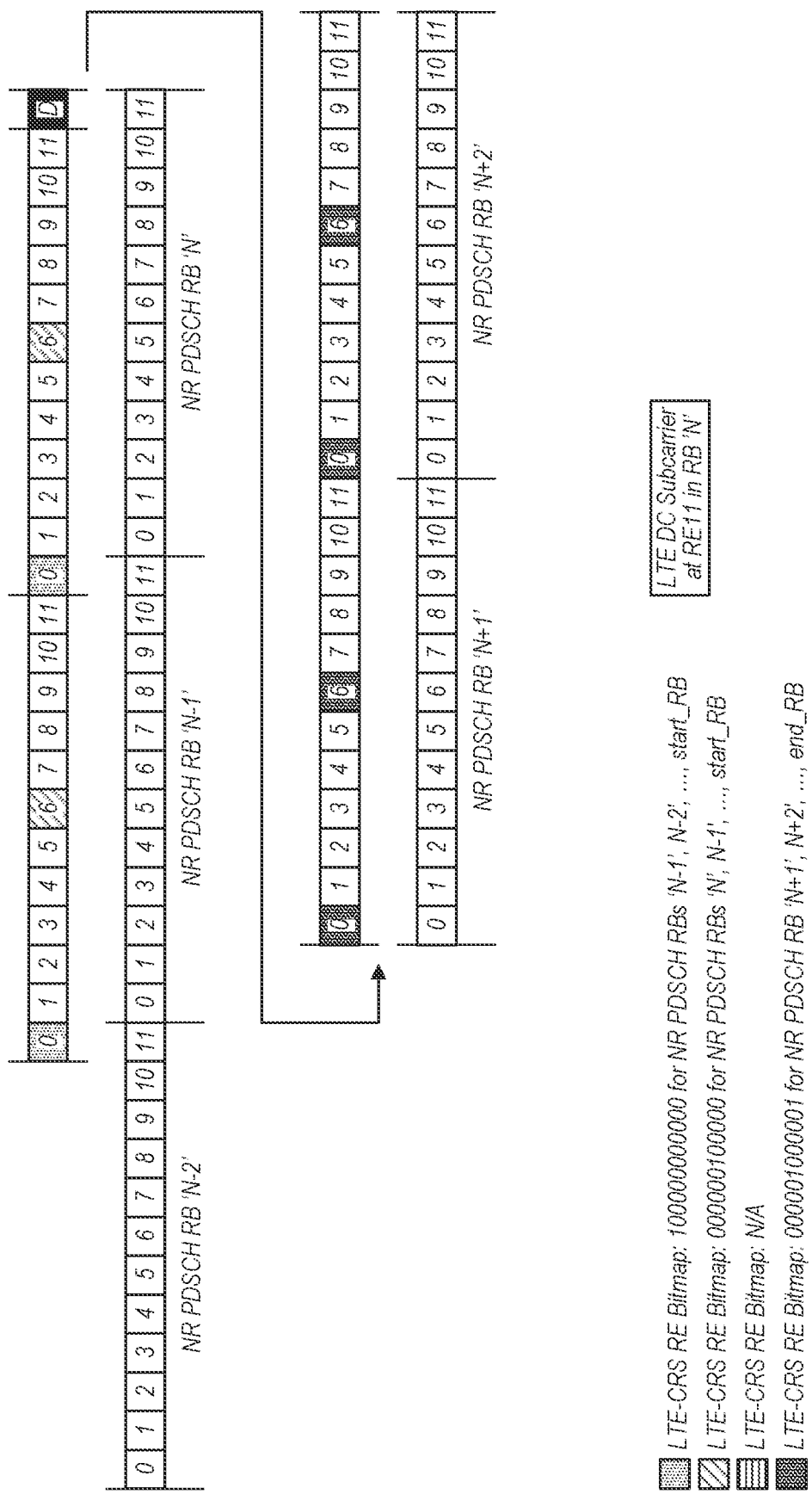
Figure 17A:
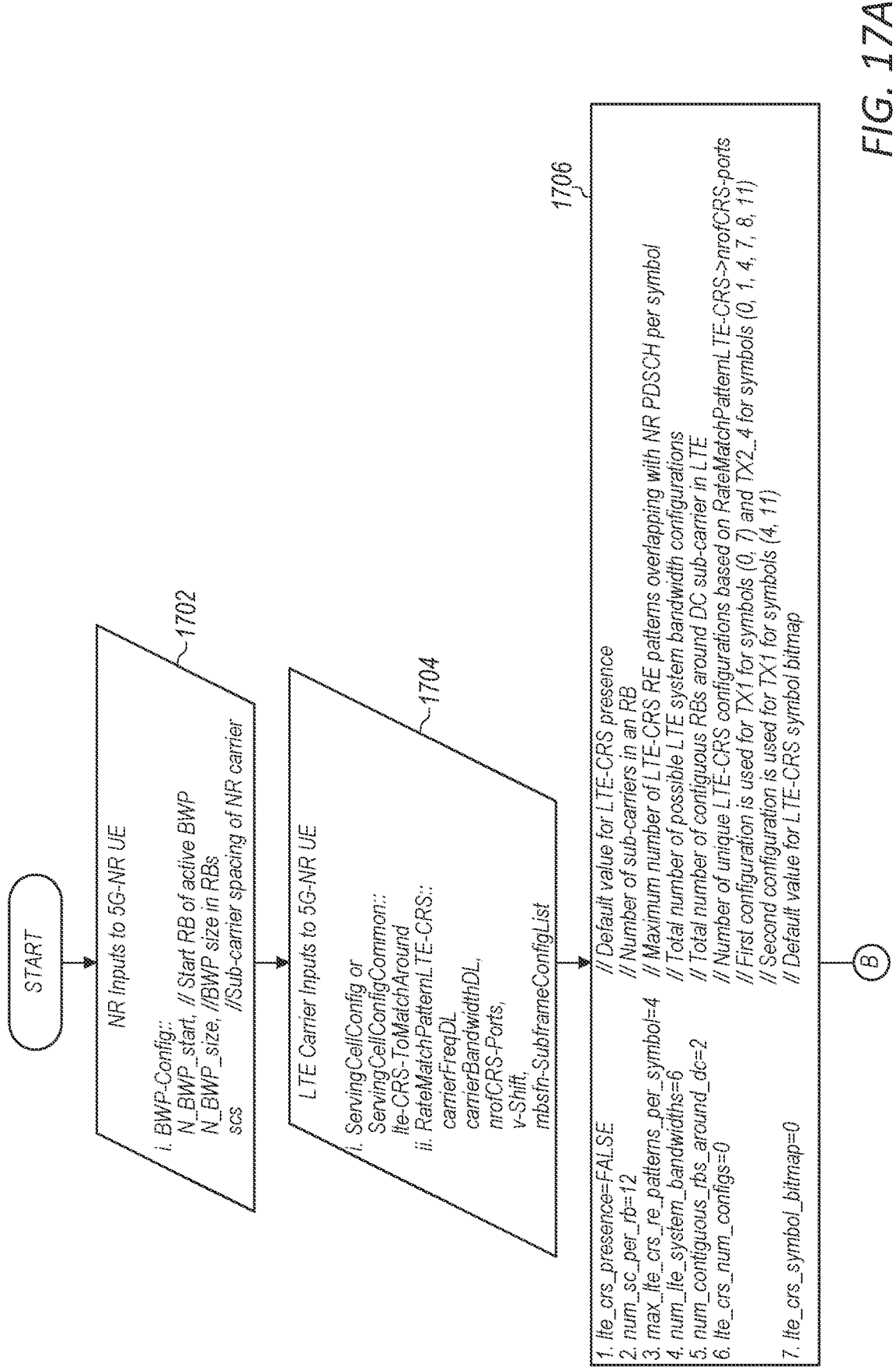
FIGS. 17A-17E illustrate a flowchart diagram illustrating aspects of an exemplary possible detailed algorithm for deriving LTE CRS rate matching patterns for NR PDSCH resource mapping, according to some embodiments.
Figure 17B:
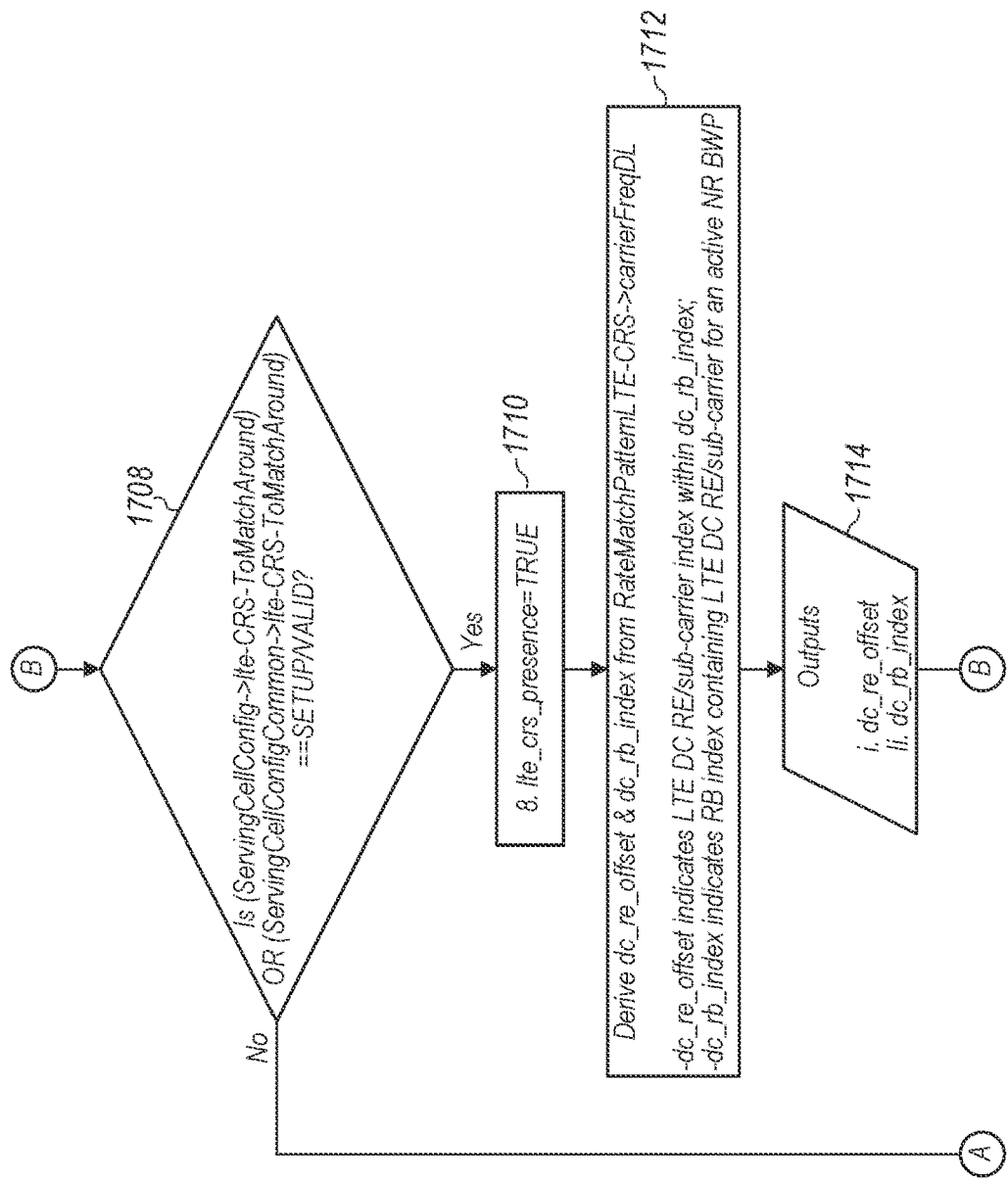
Figure 17C:
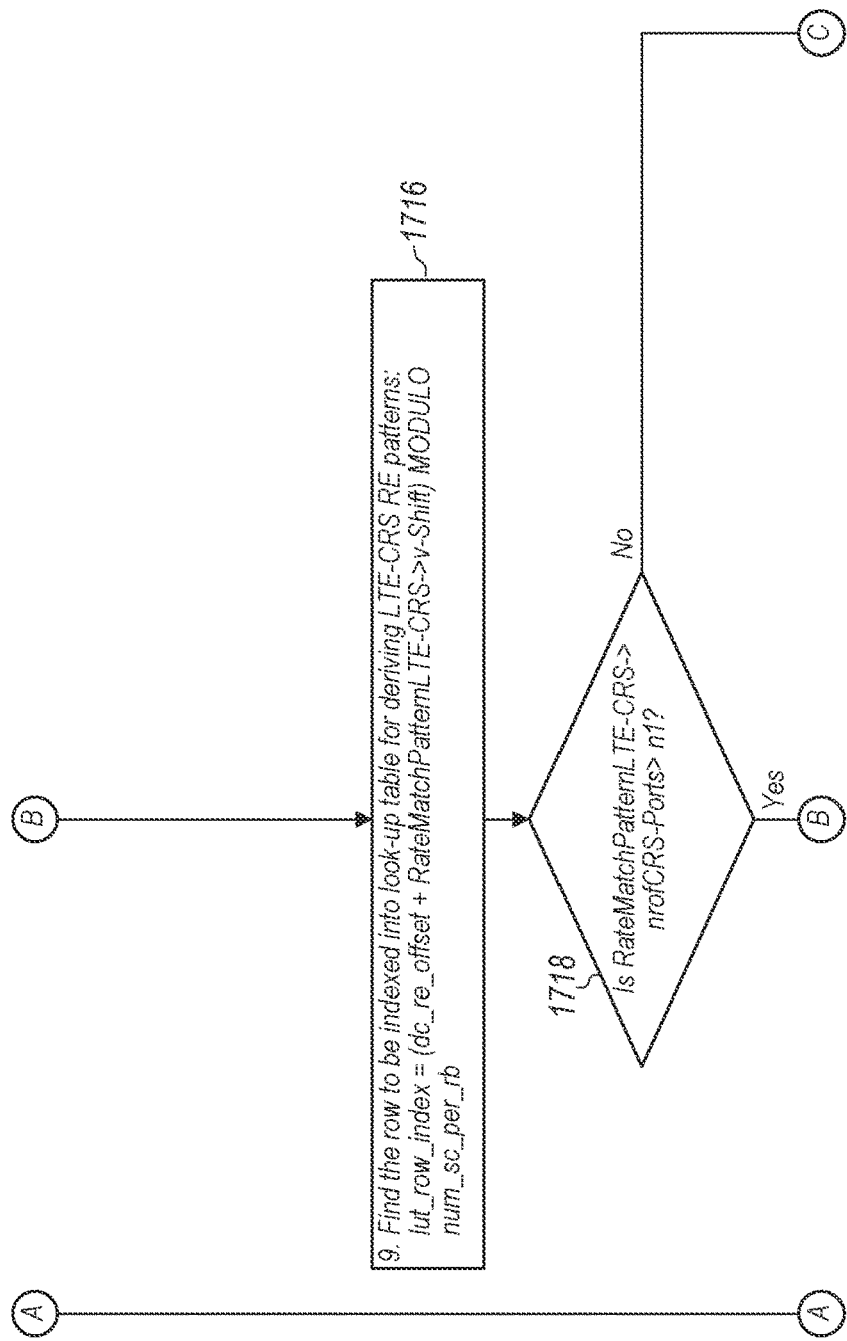
Figure 17D:
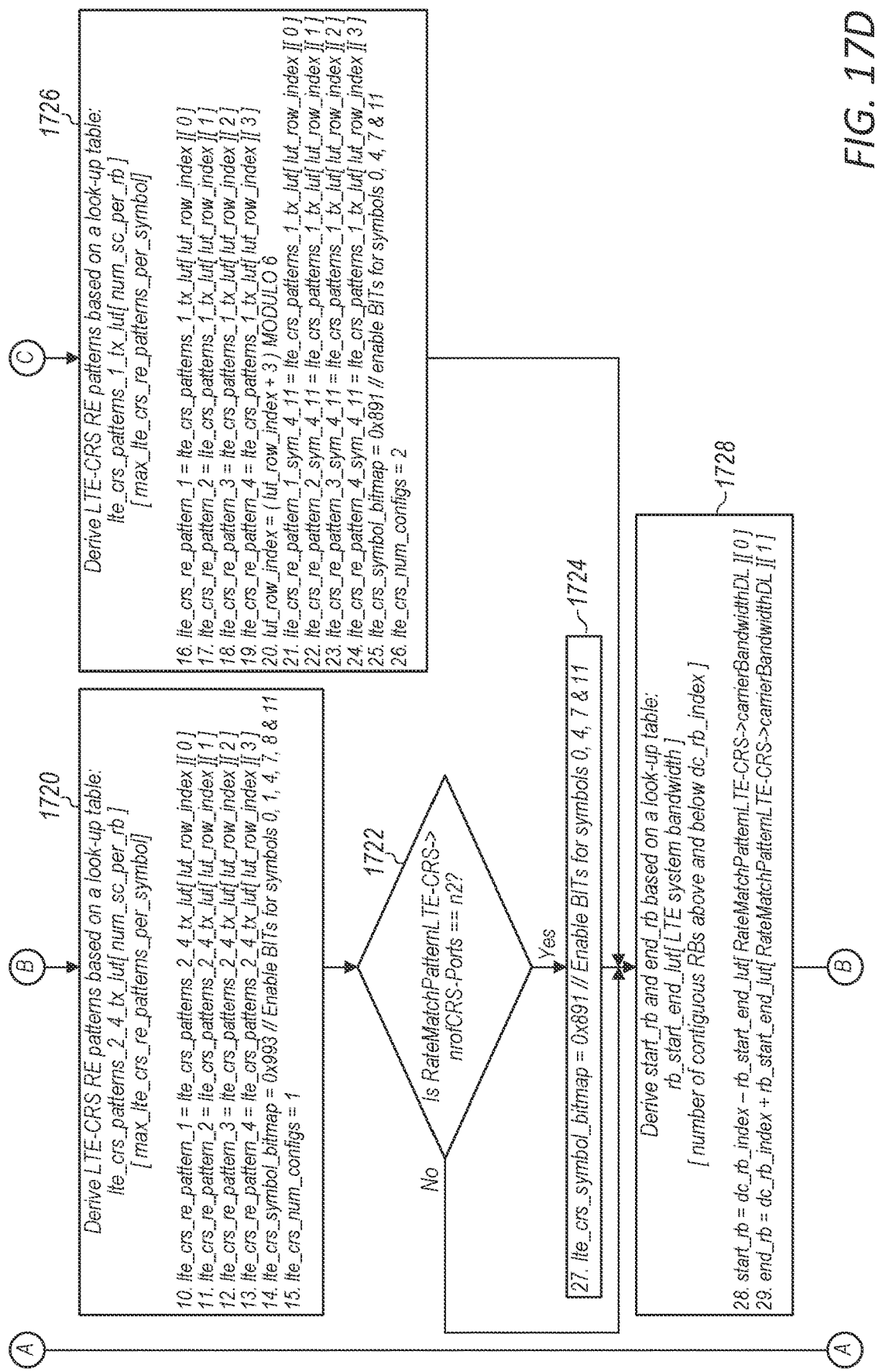
Figure 17E:
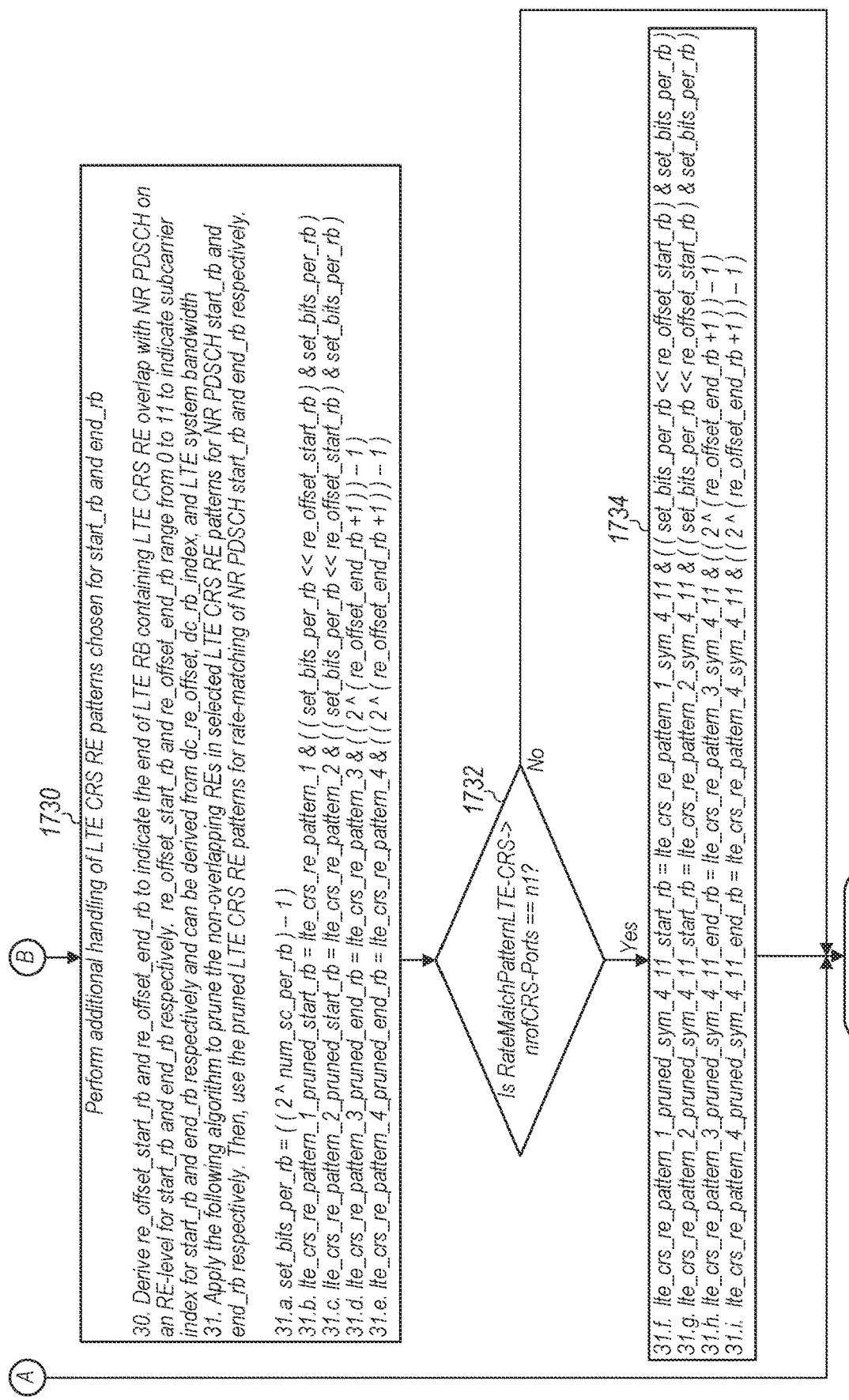

FIGS. 12-13 illustrate exemplary possible aspects of a similar approach as applied for 1 TX antenna port scenarios, according to some embodiments. In particular, FIG. 12 illustrates a scenario with a set of four LTE CRS RE patterns of 12 bits in length considering an example of 1 TX antenna port in a given OFDM symbol for v-shift=0 overlapping with NR PDSCH allocated RBs around the LTE carrier's DC subcarrier, while FIG. 13 illustrates a scenario with a set of three LTE CRS RE patterns of 12 bits in length considering an example of 1 TX antenna port in a given OFDM symbol for v-shift=0 overlapping with NR PDSCH allocated RBs around the LTE carrier's DC subcarrier.

As shown in FIG. 12, the LTE DC subcarrier overlapping at RE10 in NR PDSCH RB "N" results in four LTE CRS RE patterns. This scenario may be considered similar to the example scenario of FIG. 8, but with 1 TX antenna port instead of 2 or 4 antenna ports in a given OFDM symbol for v-Shift=0. The four LTE CRS RE patterns are shaded differently and the pattern bitmaps and applicability of pattern bitmaps for NR PDSCH allocated RBs are also illustrated. It may be noted that the four LTE CRS RE patterns may have a pattern periodicity of every RB and the range for each pattern (e.g., in terms of start_rb, end_rb, and "N" (where "N" denotes the NR PDSCH RB that overlaps with the LTE DC subcarrier) is also indicated in the example scenario illustrated in FIG. 12.

As shown in FIG. 13, the LTE DC subcarrier overlapping at RE11 in NR PDSCH RB "N" results in three LTE CRS RE patterns. LTE CRS REs RE0 and RE6 in the set of RBs above the LTE DC subcarrier cross the NR PDSCH RB boundary and hence form one RE pattern. Implicitly, this may result in the pattern shaded horizontally in the scenario of FIG. 12 not being applicable in the scenario of FIG. 13. The three LTE CRS RE patterns are shaded differently and the pattern bitmaps and applicability of pattern bitmaps for NR PDSCH allocated RBs are also illustrated. It may be noted that the three LTE CRS RE patterns may have a pattern periodicity of every RB and the range for each pattern (e.g., in terms of start_rb, end_rb, and "N" (where "N" denotes the NR PDSCH RB that overlaps with the LTE DC subcarrier) is also indicated in the example scenario illustrated in FIG. 13.

At least according to some embodiments, an approach that separates LTE CRS RE regions into one below the LTE DC subcarrier and one above the LTE DC subcarrier such that the LTE CRS REs that overlap with NR PDSCH allocated REs can be represented in four or fewer LTE CRS RE patterns, such as according to the various scenarios of FIGS. 8-13 and/or as could be implemented in various other LTE CRS configurations, may reduce the total number of LTE CRS RE patterns used to rate-match NR PDSCH allocated REs per OFDM symbol and per NR slot. Minimizing the total number of LTE CRS RE patterns per symbol and per slot may reduce further processing of LTE CRS RE patterns in software and/or hardware, thereby potentially providing savings on hardware area and processing power, and/or allowing for support of additional RE patterns (e.g., for other rate-matching purposes, etc.), such as defined by UE capability parameters pdsch-RE-MappingFR1-PerSymbol, pdsch-RE-MappingFR1-PerSlot, pdsch-RE-MappingFR2-PerSymbol, and/or pdsch-RE-MappingFR2-

PerSlot in a 5G NR UE for RE level NR PDSCH resource mapping, at least according to some embodiments.

It may be possible to provide a formalized step-by-step algorithm for implementing the techniques described herein for deriving LTE CRS RE patterns and using those patterns for performing LTE CRS rate matching for NR PDSCH resource allocation, at least according to some embodiments. FIGS. 17A-E illustrate one example of such a possible algorithm. One aspect of such an algorithm may include storing look-up tables (e.g., that may be developed/computed offline) for LTE CRS RE patterns for different scenarios of v-Shift, nrofCRS-Ports, carrierBandwidthDL, and carrierFreqDL for one LTE carrier configured to a 5G NR UE. In some instances (e.g., in case of a 3GPP Release 16 multi-TRP scenario), it may be possible that the number of configured LTE carriers for a 5G NR UE can be more than one. In such a scenario, the same look-up tables can be reused to derive LTE CRS RE patterns for all configured LTE carriers to a 5G NR UE. FIG. 14 illustrates one such possible look-up table showing offline computed LTE CRS RE patterns for nrofCRS-Ports=2 or 4 TX antenna ports in a given OFDM symbol for different v-Shift and LTE DC subcarrier location values. As shown, the look-up table may include a number of rows equal to the number of subcarriers or REs per resource block (e.g., 12, in the illustrated example, such as may be common in FR1), and a number of columns equal to the maximum number of LTE CRS RE patterns overlapping with NR PDSCH RBs in a given OFDM symbol (e.g., 4 in the illustrated example, such as may be the case using the approach described herein with respect to the various scenarios of FIGS. 8-11). Similarly, FIG. 15 illustrates one such possible look-up table showing offline computed LTE CRS RE patterns for nrofCRS-Ports=1 TX antenna port in a given OFDM symbol for different v-Shift and LTE DC subcarrier location values. As shown, the look-up table may include a number of rows equal to the number of subcarriers or REs per resource block (e.g., 12, in the illustrated example, such as may be common in FR1), and a number of columns equal to the maximum number of LTE CRS RE patterns overlapping with NR PDSCH RBs in a given OFDM symbol (e.g., 4 in the illustrated example, such as may be the case using the approach described herein with respect to the various scenarios of FIGS. 12-13).

Using the knowledge of carrierFreqDL (e.g., used to derive LTE DC subcarrier location denoted as "D" in FIGS. 8-13 and as dc_re_offset in the algorithm in FIGS. 17A-E) and v-Shift, a row index into one of the two proposed look-up tables can be computed by a 5G NR UE in order to derive the LTE CRS RE patterns applicable for relevant OFDM symbols in a NR slot. The row index may be indicated in step-9 of the algorithm in FIGS. 17A-E. One of the two look-up tables illustrated in FIGS. 14-15 may be selected based on nrofCRS-Ports. Note that for 1 TX antenna port for OFDM symbols 4 and 11 in a NR slot, it may be the case that the LTE CRS RE patterns are derived with an adjustment to row index from the initially computed (e.g., for OFDM symbols 0 and 7) row index. Note also that for values of 0 in a look-up table, it may be the case that no LTE CRS RE pattern is applicable, and rows containing such entries in the look-up table may result in less than four LTE CRS RE patterns for a given OFDM symbol in a NR slot.

For 4 TX antenna ports, LTE CRS RE patterns may be applied to OFDM symbols 0, 1, 4, 7, 8, and 11 (e.g., indicated in step-14 of the algorithm in FIGS. 17A-E) and for 1 or 2 TX antenna ports, LTE CRS RE patterns may be applied to OFDM symbols 0, 4, 7, and 11 (e.g., indicated in step-25 and step-27 of the algorithm in FIGS. 17A-E. For LTE subframes that are of MBSFN type (e.g., as governed by mbsfn-SubframeConfigList), it may be the case that LTE CRS RE patterns are applied to OFDM symbols 0 and 1 (e.g., with whether the LTE CRS RE patterns are applied to both symbols 0 and 1 or just to symbol 0 potentially further governed by nrofCRS-Ports) and are not applied to the remaining OFDM symbols of a NR slot. The parameter carrierFreqDL may also be used to derive the NR PDSCH RB "N" (where "N" denotes NR PDSCH RB that overlaps with LTE DC subcarrier, as indicated in FIGS. 8-13), which may be denoted using the variable "dc_rb_index" after step-8 of the algorithm in FIGS. 17A-E. The parameters start_rb and end_rb may be calculated in step-28 and step-29 respectively of the algorithm in FIGS. 17A-E, using "N" and a look-up table configured for such calculation based on the possible set of LTE bandwidths and the LTE carrier information indicating the bandwidth of the LTE carrier, carrierBandwidthDL. FIG. 16 illustrates one such possible look-up table. As shown, the look-up table may include a number of rows equal to the number of possible LTE system bandwidths (e.g., 6, in the illustrated example, corresponding to 1.4 MHz, 3 MHz, 5 MHz, 10 MHz, 15 MHz, and 20 MHz LTE system bandwidths), and a number of columns equal to the total number of contiguous sets of RBs around the LTE DC subcarrier (e.g., 2, in the illustrated example, corresponding to one set of RBs below the LTE DC subcarrier and one set of RBs above the LTE DC subcarrier).

The algorithm of FIGS. 17A-E may be performed by a 5G NR UE, according to some embodiments. As shown, in 1702, the UE may receive NR inputs including a BWP-Config RRC IE indicating at least the parameters N_BWP_start (e.g., indicating the start RB of the active BWP), N_BWP_size (e.g., indicating the BWP size in RBs), and scs (e.g., indicating the subcarrier spacing of the NR carrier). In 1704, the UE may receive LTE carrier inputs including a ServingCellConfig or ServingCellConfigCommon RRC IE indicating at least a lte-CRS-ToMatchAround parameter (e.g., indicating to perform LTE CRS RE rate matching for the NR PDSCH resource allocation), and a RateMatchPatternLTE-CRS RRC IE indicating at least a carrierFreqDL parameter, a carrierBandwidthDL parameter, a nrofCRS-Ports parameter, a v-Shift parameter, and (possibly) a mbsfn-SubframeConfigList parameter, all of which may be defined as previously described herein, at least according to some embodiments.

In 1706, the UE may initialize various parameter values for the purposes of the algorithm. In step-1, a parameter ite_crs_presense=FALSE may be set, as the default value for LTE CRS presence. In step-2, a parameter num_sc_per_rb=12 may be set, e.g., as the number of subcarriers in an RB. In step-3, a parameter max_lte_crs_re_patterns_per_symbol=4 may be set, e.g., as the maximum number of LTE CRS RE patterns overlapping with NR PDSCH per symbol (e.g., for a given LTE carrier). In step-4, a parameter num_lte_system_bandwidths=6 may be set, e.g., as the total number of possible LTE system bandwidth configurations. In step-5, a parameter num_contiguous_rbs_around_dc=2 may be set, e.g., as the total number of contiguous RB sets around the DC sub-carrier in LTE. In step-6, a parameter lte_crs_num_configs=0 may be set, e.g., as an initial value for the number of unique LTE CRS configurations to be used for a given LTE carrier, which may be updated in a subsequent step based on the parameter nrofCRS-ports from RateMatchPatternLTE-CRS. For example, a first configuration may be used for TX1 for symbols (0,7), for TX2 for symbols (0,4,7,11), and for TX4 for symbols (0,1,4,7,8,11), while a second configuration may be used for TX1 for symbols (4,11). In step-7, a parameter lte_crs_symbol_bitmap=0 may be set, e.g., as the default value for LTE CRS symbol bitmap.

In 1708, the UE may determine whether to perform LTE CRS rate matching for the NR PDSCH. This decision may be based at least in part on if a lte-CRS-ToMatchAround parameter is set (and provides a valid setup) in ServingCellConfig or ServingCellConfigCommon configuration information. In 1710, if so, in step-8, the UE may set the parameter ite_crs_presence=TRUE. If not, the UE may proceed to the end of the algorithm, e.g., as it may be the case that LTE CRS RE rate matching for the NR PDSCH resource allocation is not needed. In 1712, the UE may derive dc_re_offset and dc_rb_index parameter values from the carrierFreqDL parameter provided in the RateMatchPatternLTE-CRS configuration information. The dc_re_offset parameter may indicate the LTE DC RE/subcarrier index within dc_rb_index, while the dc_rb_index parameter may indicate the RB index containing the LTE DC RE/subcarrier for an active NR BWP. In 1714, the outputs dc_re_offset and dc_rb_index may be stored. In 1716, as step-9, the UE may find the row to be indexed into the look-up table for deriving the LTE CRS RE patterns for the rate matching. The look-up table row index may be calculated as lut_row_index= (dc_re_offset+RateMatchPatternLTE-CRS→v-Shift) MODULO num_sc_per_rb. In 1718, the UE may determine whether the number of LTE CRS ports is one or more than one (e.g., whether RateMatchPatternLTE-CRS→nrofCRS-Ports>1).

If the number of LTE CRS ports is more than one, in 1720, the UE may proceed to derive the LTE-CRS RE patterns based on a look-up table for 2 TX antenna port and 4 TX antenna port LTE CRS configurations, lte_crs_patterns_2_4_tx_lut [num_sc_per_rb] [max_lte_crs_re_patterns_per_symbol], e.g., such as illustrated in FIG. 14. In step-10, lte_crs_re_pattern_1 may be set as column 0 of the selected row index of the selected look-up table and may be applied in a range from start_rb, i.e., the lowest frequency RB of the PDSCH that includes one or more resource elements (REs) that overlap with one or more LTE CRS REs for the configured LTE carrier through an RB of the PDSCH adjacent to and lower in frequency than dc_rb_index. In step-11, lte_crs_re_pattern_2 may be set as column 1 of the selected row index of the selected look-up table and may be applied in a range from start_rb through dc_rb_index. In step-12, lte_crs_re_pattern_3 may be set as column 2 of the selected row index of the selected look-up table and may be applied in a range from dc_rb_index through end_rb, i.e., the highest frequency RB of the PDSCH that includes one or more REs that overlap with one or more LTE CRS REs for the configured LTE carrier. In step-13, lte_crs_re_pattern_4 may be set as column 3 of the selected row index of the selected look-up table and may be applied in a range from the RB of the PDSCH adjacent to and higher in frequency than dc_rb_index through end_rb. In step-14, the parameter lte_crs_symbol_bitmap=0x993 may be set, e.g., to enable BITs for symbols 0, 1, 4, 7, 8, and 11. In step-15, the parameter lte_crs_num_configs=1 may be set.

In 1722, the UE may make a check as to whether the number of LTE CRS TX antenna ports is equal to 2. If not, the parameters set in 1720 may be appropriate (e.g., for the 4 TX antenna port LTE CRS configuration), and the algorithm may proceed to 1728. If the number of LTE CRS TX antenna ports is equal to 2 (e.g., RateMatchPatternLTE-CRS→nrofCRS-Ports==n2), in 1724, the parameter lte_crs_symbol_bitmap=0x891 may be set, e.g., to enable BITS for symbols 0, 4, 7, and 11 (e.g., to account for LTE CRS symbols being absent from symbols 1 and 8 in the 2 TX antenna port LTE CRS configuration). The algorithm may then proceed to 1728.

If the number of LTE CRS ports is one, the algorithm may proceed from 1718 to 1726, and the UE may proceed to derive the LTE-CRS RE patterns based on a look-up table for 1 TX antenna port LTE CRS configurations, lte_crs_patterns_1_tx_lut [num_sc_per_rb] [max_1 te_crs_re_patterns_per_symbol], e.g., such as illustrated in FIG. 15. In step-16, lte_crs_re_pattern_1 may be set as column 0 of the selected row index of the selected look-up table. In step-17, lte_crs_re_pattern_2 may be set as column 1 of the selected row index of the selected look-up table. In step-18, lte_crs_re_pattern_3 may be set as column 2 of the selected row index of the selected look-up table. In step-19, lte_crs_re_pattern_4 may be set as column 3 of the selected row index of the selected look-up table. In step-20, the parameter lut_row_index=(lut_row_index+3) MODULO 6 may be set, e.g., to adjust the lookup table row index to account for the LTE CRS REs being offset by 3 subcarriers in symbols 4 and 11 relative to symbols 0 and 7 for 1 TX antenna port LTE CRS configurations. In step-21, lte_crs_re_pattern_1_sym_4_11 may be set as column 0 of the selected row index of the selected look-up table. In step-22, lte_crs_re_pattern_2_sym_4_11 may be set as column 1 of the selected row index of the selected look-up table. In step-23, lte_crs_re_pattern_3_sym_4_11 may be set as column 2 of the selected row index of the selected look-up table. In step-24, lte_crs_re_pattern_4_sym_4_11 may be set as column 3 of the selected row index of the selected look-up table. At least according to some embodiments, it may be the case that lte_crs_re_pattern_1 and lte_crs_re_pattern_1_sym_4_11 are applied in a range from start_rb, i.e., the lowest frequency RB of the PDSCH that includes one or more resource elements (REs) that overlap with one or more LTE CRS REs for the configured LTE carrier through an RB of the PDSCH adjacent to and lower in frequency than dc_rb_index. It may be the case that lte_crs_re_pattern_2 and lte_crs_re_pattern_2_sym_4_11 are applied in a range from start_rb through dc_rb_index. It may be the case that lte_crs_re_pattern_3 and lte_crs_re_pattern_3_sym_4_11 are applied in a range from dc_rb_index through end_rb, i.e., the highest frequency RB of the PDSCH that includes one or more REs that overlap with one or more LTE CRS REs for the configured LTE carrier. It may be the case that lte_crs_re_pattern_4 and lte_crs_re_pattern_4_sym_4_11 are applied in a range from the RB of the PDSCH adjacent to and higher in frequency than dc_rb_index through end_rb. In step-25, the parameter lte_crs_symbol_bitmap=0x891 may be set, e.g., to enable BITs for symbols 0, 4, 7, and 11. In step-26, the parameter lte_crs_num_configs=2 may be set. The algorithm may then proceed to 1728.

In 1728, the UE may derive the start_rb and end_rb parameters based on a look-up table, rb_start_end_lut [LTE system bandwidth] [number of contiguous RBs above and below dc_rb_index], e.g., such as illustrated in FIG. 16. The row of the look-up table used to derive these parameters may be determined based on an index derived from the carrierBandwidthDL parameter from the RateMatchPatternLTE-CRS configuration information. In step-28, the parameter start_rb may be set as column 0 of the selected row index of the look-up table, and in step-29, the parameter end_rb may be set as column 1 of the selected row index of the look-up table.

In 1730, the UE may apply a pruning algorithm to the selected LTE CRS RE patterns (e.g., for start_rb and end_rb of NR PDSCH only). Pruning may be required depending on the position of the first LTE CRS RE that overlaps with start_rb and/or the last LTE CRS RE that overlaps with end_rb. The pruning operation may effectively remove the non-overlapping REs in the selected LTE CRS RE patterns for start_rb and end_rb respectively by considering the subcarrier index position that indicate the extent of LTE RB overlap with start_rb and end_rb respectively. In step-30, the UE may derive re_offset_start_rb and re_offset_end_rb, which may indicate the start or end of the LTE RB containing LTE CRS RE overlap with NR PDSCH on an RE-level for start_rb and end_rb respectively. It may be the case that re_offset_start_rb and re_offset_end_rb each have a value ranging from 0 to 11 and may be derived from dc_re_offset, dc_rb_index and the LTE system bandwidth, at least according to some embodiments. In step-31a, the parameter set_bits_per_rb=((2^num_sc_per_rb)−1) may be set, e.g., to set all 12 bits of a RE bitmap in little-Endian format. In step-31b, pruning may be applied to lte_crs_re_pattern_1 for start_rb of the NR PDSCH. In step-31c, pruning may be applied to lte_crs_re_pattern_2 for start_rb of the NR PDSCH. In step-31d, pruning may be applied to lte_crs_re_pattern_3 for end_rb of the NR PDSCH. In step-31e, pruning may be applied to lte_crs_re_pattern_4 for end_rb of the NR PDSCH. If the pruning operation results in a value of zero, then the pruned LTE CRS RE pattern may not be applied to the respective start_rb and/or end_rb of the NR PDSCH. The pruning operation may be done at the time of performing LTE CRS RE-level rate matching for start_rb and end_rb of the NR PDSCH, at least as one possibility.

Figure 18:
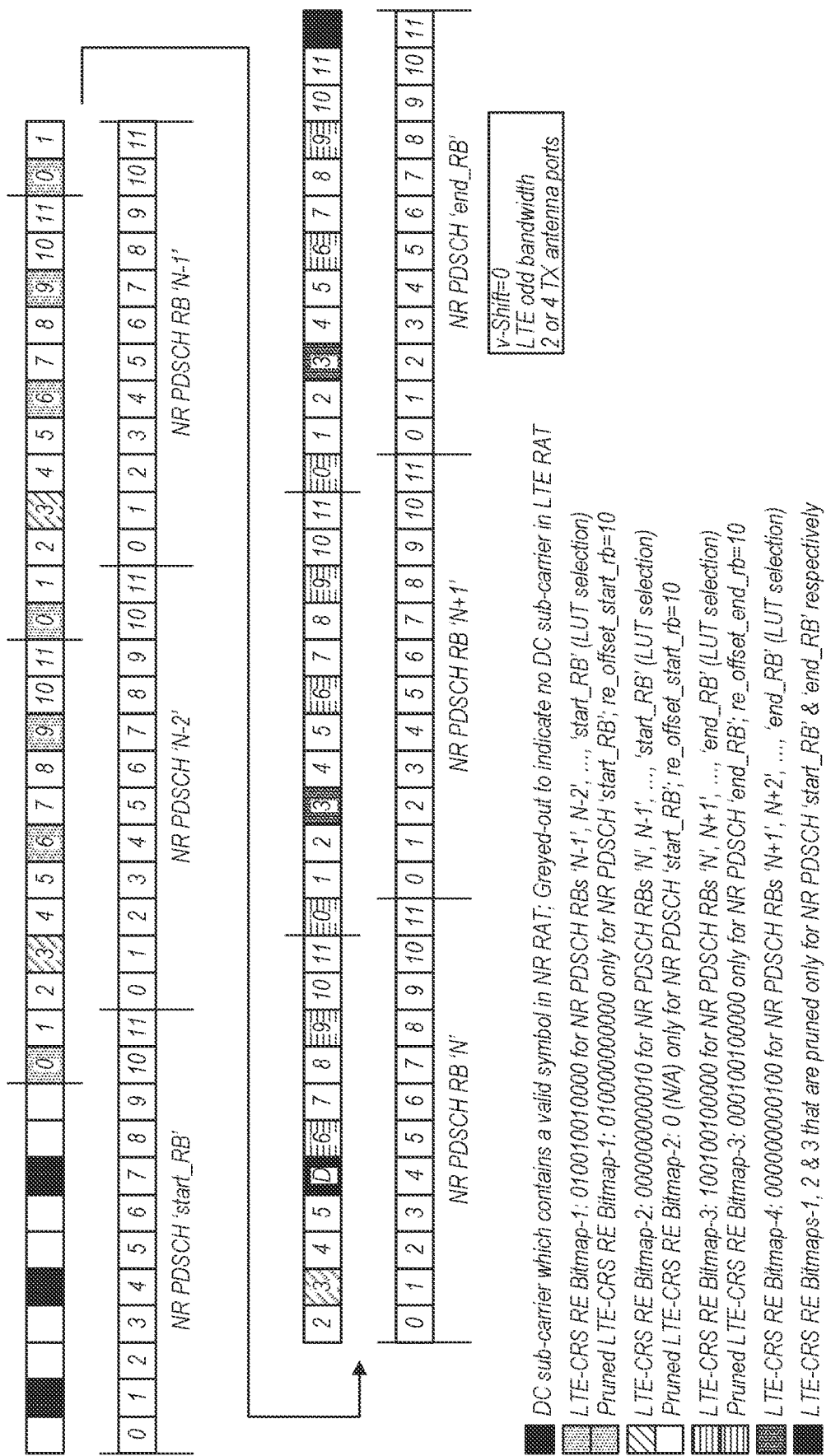
FIG. 18 illustrates an example scenario in which pruning is performed for LTE CRS RE patterns for the starting and ending resource blocks of a NR PDSCH resource allocation.

As an example, FIG. 18 illustrates aspects of one possible LTE CRS rate matching scenario in which such pruning could be performed for the start_rb and end_rb of the NR PDSCH. In the illustrated scenario, LTE CRS rate matching may be performed for an LTE odd bandwidth carrier with v-Shift={0} and 2 or 4 TX antenna ports, where re_offset_start_rb is 10 and re_offset_end_rb is 10. As shown, for the illustrated configuration, pruned bitmaps may be used for the LTE CRS RE-level rate matching for start_rb of the NR PDSCH for lte_crs_re_pattern_1 and lte_crs_re_pattern_2, as well as for end_rb of the NR PDSCH for lte_crs_re_pattern_3. In the case of lte_crs_re_pattern_2, the pruning operation may result in the pattern not being applied to start_rb at all. No pruning may be needed for end_rb of the NR PDSCH for lte_crs_re_pattern_4 in the illustrated scenario. In other scenarios (e.g., for other combinations of LTE carrier and NR PDSCH configurations), the pruning operation may be applicable to different combinations of the selected RE patterns, at least according to some embodiments.

In 1732, the UE may check as to whether the number of LTE CRS TX antenna ports is equal to 1. If not, the UE may proceed to the end of the algorithm. If the number of LTE CRS antenna ports is equal to 1, then algorithm may then proceed to 1734.

In 1734, the UE may apply pruning operation to the selected LTE CRS RE patterns for 1 TX antenna port LTE CRS configuration for symbols 4 and 11. In step-31f, pruning may be applied to lte_crs_re_pattern_1_sym_4_11 for start_rb of the NR PDSCH. In step-31g, pruning may be applied to lte_crs_re_pattern_2_sym_4_11 for start_rb of the NR PDSCH. In step-31h, pruning may be applied to lte_crs_re_pattern_3_sym_4_11 for end_rb of the NR PDSCH. In step-31i, pruning may be applied to lte_crs_re_pattern_4_sym_4_11 for end_rb of the NR PDSCH. If the pruning operation results in a value of zero, then the pruned LTE CRS RE pattern may not be applied to the respective start_rb and/or end_rb of the NR PDSCH. The pruning operation may be done at the time of performing LTE CRS RE-level rate matching for start_rb and end_rb of NR PDSCH, at least as one possibility. Once the algorithm is complete, the determined LTE CRS patterns can be used to perform rate matching for the NR PDSCH resource allocation in the symbols set for the LTE CRS rate matching.

An alternative configuration for LTE CRS overlapping with NR PDSCH can be defined at a RE level, in some embodiments. The LTE CRS overlap can be separated into two regions, e.g., below (lowBand) and above (highBand) the LTE DC carrier, which may be denoted as "D". In each of these two regions, the first (Start) and the last (End) RE may be configured. Both can be specified using the corresponding RB (e.g., rbIdx∈{0,1, . . . ,272}) and the subcarrier within this RB (scIdxε{0,1, . . . , 11}). Thus, each of four parameters lowBandStart, lowBandEnd, highBandStart, and highBandEnd can be identified using 9 bits for rbIdx and 4 bits for scIdx. In these two regions, the LTE CRS REs may follow a fixed RE step size (crsStep∈{3,6} that may depend on the number of TX ports (e.g., 3 RE step size for 2 or 4 TX antenna ports, 6 RE step size for 1 TX antenna port), and which may be identified using a 1 bit parameter crsStep (1 bit: 3 or 6 REs). This configuration may thus be represented on the RE level using (1x53 bits), which may be more compact in comparison to a LTE CRS pattern based approach which could utilize 4 LTE CRS patterns on the RB level using (4x32) bits to represent the configuration. Such an approach could thus potentially provide an area saving for a hardware implementation if used, which could be particularly beneficial for scenarios when several overlapping LTE carriers are configured (e.g., in a 3GPP Release 16 multi-TRP configuration).

Figure 19:
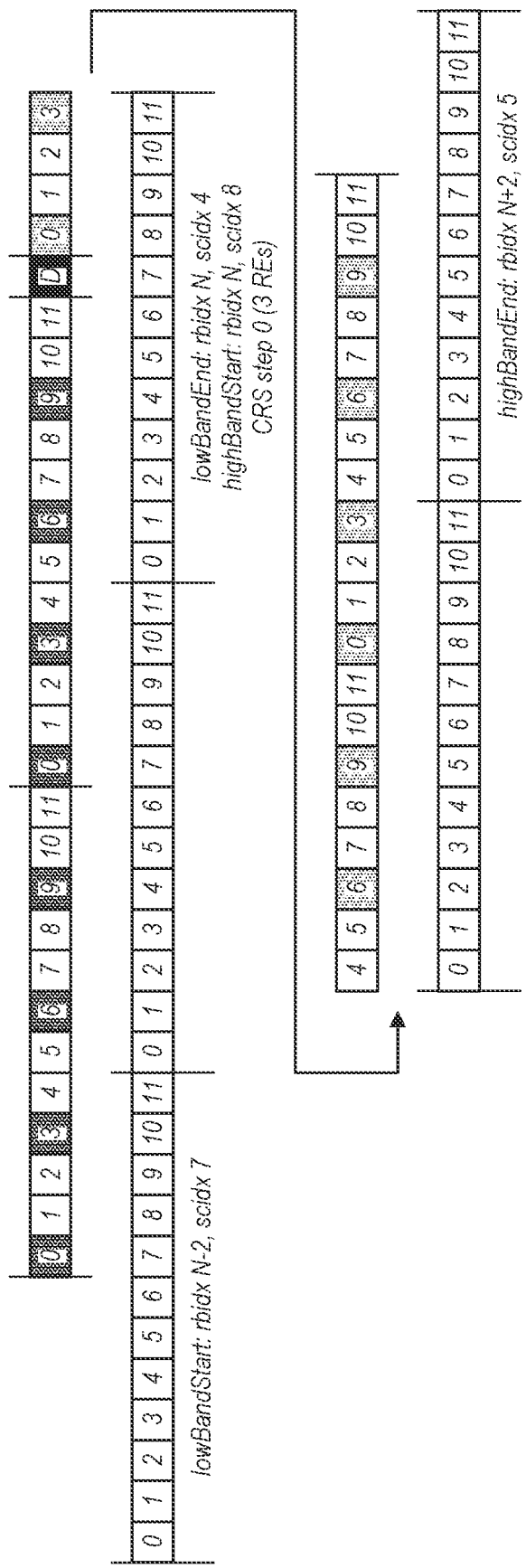
FIG. 19 illustrates aspects of another exemplary possible approach to performing LTE CRS rate matching for NR PDSCH resource mapping using a resource element level representation of LTE CRS overlap with NR PDSCH resources, according to some embodiments.

FIG. 19 illustrates aspects of an example scenario in which such a configuration could be applied, according to some embodiments. As shown, in the illustrated scenario, lowBandStart may be identified with rbIdx N−2 and scIdx 7, while lowBandEnd may be identified with rbIdx N and scIdx 4. Similarly, highBandStart may be identified with rbIdx N and scIdx 8, while highBandEnd may be identified with rbIdx N+2 and scIdx 5. Additionally, crsStep=0 may identify that the RE step size in each region is 3 REs.

The following is a pseudocode representation of a possible configuration example using such an approach for 2 or 4 TX antenna ports and even LTE bandwidth.

```
if (nfofCRS-Ports>n1) crsStep=3
  else crsStep=6
if                    (dc_re_offset+v-Shift<12)
  lowBandStart.rbIdx=dc_rb_idx−rb_start_end_lut [carrierBandwidthDL] [0]
  else  lowBandStart.rbIdx=dc_rb_idx−rb_start_end_lut [carrierBandwidthDL] [0]+1
lowBandStart.scIdx=mod(dc_re_offset+v-Shift, 12)
if (dc_re_offset>v-Shift)
  lowBandEnd.rbIdx=dc_rb_idx
  lowBandEnd.scIdx=dc_re_offset−1 (upper bound)
else
  lowBandEnd.rbIdx=dc_rb_idx−1
  lowBandEnd.scIdx=11 (upper bound)
if                   (dc_re_offset+v-Shift+1>11)
  highBandStart.rbIdx=dc_rb_idx+1
  else highBandStart.rbIdx=dc_rb_idx
``` highBandStart.scIdx=mod(dc_re_offset+v-Shift+1, 12)
if (dc_re_offset+v-Shift+10<12)
  highBandEnd.rbIdx=dc_rb_idx+rb_start_end_lut [carrierBandwidthDL] [1]
  else highBandEnd.rbIdx=dc_rb_idx+rb_start_end_lut [carrierBandwidthDL] [1]+1
highBandEnd.scIdx=mod(dc_re_offset+v-Shift+10, 12)

As previously noted, such an alternative representation to use of LTE CRS RB level patterns may reduce the number of bits used to store the same information. The software and/or hardware implementation for a given 5G NR UE could evaluate which representation to use based on performance power area (PPA) needs in deriving, representing, and storing LTE CRS overlap information with NR PDSCH and thereby enabling a 5G NR UE to rate match around LTE CRS resources for NR PDSCH RE level resource mapping in a LTE and NR co-existence scenario.

It may be a useful consideration to note that many potentially relevant NR PDSCH RE-level rate matching requirements from 3GPP Release 15 may be defined as RB-level patterns, for example for performing RE-level rate matching for PDSCH DMRS (e.g., as described in 3GPP TS 38.211 v.17.2.0 section 7.4.1.1), PTRS (e.g., as described in 3GPP TS 38.211 v.17.2.0 section 7.4.1.2), PDCCH DMRS (e.g., as described in 3GPP TS 38.211 v.17.2.0 section 7.4.1.3), and/or CSI-RS (e.g., as described in 3GPP TS 38.211 v.17.2.0 section 7.4.1.5). Thus, a 5G NR UE implementation that supports NR PDSCH rate matching as per 3GPP can be designed to also handle RB-level patterns for all RE-level rate matching requirements including LTE CRS rate matching, e.g., in order to keep the design in software and/or hardware consistent. Alternatively, the more compact representation of the example illustrated in FIG. 19 could be used only for storing LTE CRS overlap information, while RB-level patterns may be used for the remaining RE-level rate matching requirements, which may require special handling in software and/or hardware for the LTE CRS rate matching, at least according to some embodiments.

In the following further exemplary embodiments are provided.

One set of embodiments may include an apparatus, comprising: a processor configured to cause a wireless device to: establish a wireless link with a Fifth Generation (5G) New Radio (NR) cell; receive information indicating to perform long term evolution (LTE) cell specific reference signal (CRS) rate matching for a physical downlink shared channel (PDSCH) for the 5G NR cell for at least a first LTE carrier; select a first set of LTE CRS rate matching patterns associated with the first LTE carrier, wherein the first set of LTE CRS rate matching patterns includes four or fewer LTE CRS rate matching patterns; and perform LTE CRS rate matching for the PDSCH for the 5G NR cell for the first LTE carrier using the first set of LTE CRS rate matching patterns.

According to some embodiments, the processor is further configured to cause the wireless device to: determine a range of resource blocks (RBs) to which to apply each LTE CRS rate matching pattern of the selected set of LTE CRS rate matching patterns.

According to some embodiments, a first LTE CRS rate matching pattern of the first set of LTE CRS rate matching patterns is applied in a range from a lowest frequency RB of the PDSCH that includes one or more resource elements (REs) that overlap with one or more LTE CRS REs for the first LTE carrier through an RB of the PDSCH adjacent to and lower in frequency than an RB of the PDSCH that overlaps with a DC subcarrier of the first LTE carrier, wherein a second LTE CRS rate matching pattern of the first set of LTE CRS rate matching patterns is applied in a range from a lowest frequency RB of the PDSCH that includes one or more resource elements (REs) that overlap with one or more LTE CRS REs for the first LTE carrier through the RB of the PDSCH that overlaps with the DC subcarrier of the first LTE carrier, wherein a third LTE CRS rate matching pattern of the first set of LTE CRS rate matching patterns is applied in a range from the RB of the PDSCH that overlaps with the DC subcarrier of the first LTE carrier through the highest frequency RB of the PDSCH that includes one or more REs that overlap with one or more LTE CRS REs for the first LTE carrier, wherein a fourth LTE CRS rate matching pattern of the first set of LTE CRS rate matching patterns is applied in a range from an RB of the PDSCH adjacent to and higher in frequency than the RB of the PDSCH that overlaps with the DC subcarrier of the first LTE carrier through the highest frequency RB of the PDSCH that includes one or more REs that overlap with one or more LTE CRS REs for the first LTE carrier.

According to some embodiments, the processor is further configured to cause the wireless device to: store one or more lookup tables for LTE CRS rate matching patterns, wherein the first set of LTE CRS rate matching patterns is selected from the one or more lookup tables for LTE CRS rate matching patterns.

According to some embodiments, the processor is further configured to cause the wireless device to: receive cell information for the 5G NR cell from the 5G NR cell; and receive LTE carrier information for the first LTE carrier from the 5G NR cell, wherein the first set of LTE CRS rate matching patterns is selected based at least in part on the cell information for the first cell and the LTE carrier information for the first LTE carrier.

According to some embodiments, the LTE carrier information includes at least an indication of a number of LTE CRS antenna ports for the first LTE carrier, wherein the processor is further configured to cause the wireless device to: determine in which orthogonal frequency division multiplexing (OFDM) symbols for the 5G NR cell to perform LTE CRS rate matching for the PDSCH for the 5G NR cell for the first LTE carrier based at least in part on the number of LTE CRS antenna ports for the first LTE carrier.

According to some embodiments, the processor is further configured to cause the wireless device to: receive information indicating to perform LTE CRS rate matching for the PDSCH for the 5G NR cell for at least a second LTE carrier; select a second set of LTE CRS rate matching patterns associated with the second LTE carrier, wherein the second set of LTE CRS rate matching patterns includes four or fewer LTE CRS rate matching patterns; and perform LTE CRS rate matching for the PDSCH for the 5G NR cell for the second LTE carrier using the second set of LTE CRS rate matching patterns.

Another set of embodiments may include a wireless device, comprising: an antenna; a radio operably coupled to the antenna; and a processor operably coupled to the radio; wherein the wireless device is configured to: establish a wireless link with a first cell provided by a cellular base station, wherein the first cell operates according to Fifth Generation (5G) New Radio (NR); receive information indicating to perform long term evolution (LTE) cell specific reference signal (CRS) rate matching for a physical downlink shared channel (PDSCH) for the first cell for at least a first LTE carrier; select a first set of LTE CRS rate matching patterns for performing LTE CRS rate matching for the PDSCH for the first cell for the first LTE carrier, wherein the first set of LTE CRS rate matching patterns includes four or fewer LTE CRS rate matching patterns; and perform LTE CRS rate matching for the PDSCH for the first cell for the first LTE carrier using the first set of LTE CRS rate matching patterns.

According to some embodiments, the wireless device is further configured to: determine a range of resource blocks to which to apply each LTE CRS rate matching pattern of the selected set of LTE CRS rate matching patterns.

According to some embodiments, a range of resource blocks (RBs) to which to apply a first LTE CRS rate matching pattern of the first set of LTE CRS rate matching patterns extends between a lowest frequency RB of the PDSCH that includes one or more resource elements (REs) that overlap with one or more LTE CRS REs for the first LTE carrier and an RB of the PDSCH adjacent to and lower in frequency than an RB of the PDSCH that overlaps with a DC subcarrier of the first LTE carrier, wherein a range of RB s to which to apply a second LTE CRS rate matching pattern of the first set of LTE CRS rate matching patterns extends between the lowest frequency RB of the PDSCH that includes one or more resource elements (REs) that overlap with one or more LTE CRS REs for the first LTE carrier and the RB of the PDSCH that overlaps with the DC subcarrier of the first LTE carrier, wherein a range of RB s to which to apply a third LTE CRS rate matching pattern of the first set of LTE CRS rate matching patterns extends between the RB of the PDSCH that overlaps with the DC subcarrier of the first LTE carrier and the highest frequency RB of the PDSCH that includes one or more REs that overlap with one or more LTE CRS REs for the first LTE carrier, wherein a range of RBs to which to apply a fourth LTE CRS rate matching pattern of the first set of LTE CRS rate matching patterns extends between an RB of the PDSCH adjacent to and higher in frequency than the RB of the PDSCH that overlaps with the DC subcarrier of the first LTE carrier and the highest frequency RB of the PDSCH that includes one or more REs that overlap with one or more LTE CRS REs for the first LTE carrier.

According to some embodiments, the wireless device is further configured to: store one or more lookup tables for LTE CRS rate matching patterns, wherein the first set of LTE CRS rate matching patterns is selected from the one or more lookup tables for LTE CRS rate matching patterns.

According to some embodiments, the one or more lookup tables for LTE CRS rate matching patterns include at least: a lookup table for LTE CRS rate matching patterns for 1 transmit (TX) antenna port LTE CRS configurations; and a lookup table for LTE CRS rate matching patterns for more than 1 TX antenna port LTE CRS configurations.

According to some embodiments, the wireless device is further configured to: receive cell information for the first cell; and receive LTE carrier information for the first LTE carrier, wherein the first set of LTE CRS rate matching patterns is selected based at least in part on the cell information for the first cell and the LTE carrier information for the first LTE carrier.

According to some embodiments, the wireless device is further configured to: receive information indicating to perform LTE CRS rate matching for the PDSCH for the first cell for at least a second LTE carrier; select a second set of LTE CRS rate matching patterns for performing LTE CRS rate matching for the PDSCH for the first cell for the second LTE carrier, wherein the second set of LTE CRS rate matching patterns includes four or fewer LTE CRS rate matching patterns; and perform LTE CRS rate matching for the PDSCH for the first cell for the second LTE carrier using the second set of LTE CRS rate matching patterns.

Yet another set of embodiments may include a method, comprising: by a wireless device: establishing a wireless link with a first cell provided by a cellular base station, wherein the first cell operates according to fifth generation (5G) new radio (NR); receiving information indicating to perform long term evolution (LTE) cell specific reference signal (CRS) rate matching for a physical downlink shared channel (PDSCH) for the first cell; determining which resource elements (REs) of a PDSCH allocation for the first cell overlap with LTE CRS REs; storing a RE-level representation of which REs of the PDSCH allocation for the first cell overlap with LTE CRS REs; and performing LTE CRS rate matching for the PDSCH for the first cell using the RE-level representation of which REs of the PDSCH allocation for the first cell overlap with LTE CRS REs.

According to some embodiments, the RE-level representation of which REs of the PDSCH allocation for the first cell overlap with LTE CRS REs includes resource block index and subcarrier index information for each of a start of a frequency range below a LTE DC subcarrier, an end of the frequency range below the LTE DC subcarrier, a start of a frequency range above the LTE DC subcarrier, and an end of the frequency range above the LTE DC subcarrier.

According to some embodiments, the method further comprises: receiving LTE carrier information from the first cell, wherein the LTE carrier information received from the first cell indicates at least a location of the LTE DC subcarrier, a system bandwidth of the LTE carrier, and a LTE CRS frequency shift for the LTE carrier, wherein the resource block index and subcarrier index information for each of the start of the frequency range below the LTE DC subcarrier, the end of the frequency range below the LTE DC subcarrier, the start of the frequency range above the LTE DC subcarrier, and the end of the frequency range above the LTE DC subcarrier are determined based at least in part on the location of the LTE DC subcarrier, the system bandwidth of the LTE carrier, and the LTE CRS frequency shift for the LTE carrier.

According to some embodiments, the RE-level representation of which REs of the PDSCH allocation for the first cell overlap with LTE CRS REs further includes an indication of a RE step size for LTE CRS REs in the frequency range below the LTE DC subcarrier and in the frequency range above the LTE DC subcarrier.

According to some embodiments, the method further comprises: receiving LTE carrier information from the first cell, wherein the LTE carrier information received from the first cell indicates at least a number of LTE CRS antenna ports for the LTE carrier, wherein the RE step size for LTE CRS REs in the frequency range below the LTE DC subcarrier and in the frequency range above the LTE DC subcarrier is determined based at least in part on the number of LTE CRS antenna ports for the LTE carrier.

According to some embodiments, the method further comprises: receiving LTE carrier information from the first cell, wherein the LTE carrier information received from the first cell indicates at least a number of LTE CRS antenna ports for the LTE carrier; and determining in which orthogonal frequency division multiplexing (OFDM) symbols for the first cell LTE CRS REs overlap with the PDSCH allocation for the first cell based at least in part on the number of LTE CRS antenna ports for the LTE carrier, wherein the LTE CRS rate matching for the PDSCH for the first cell using the RE-level representation of which REs of the PDSCH allocation for the first cell overlap with LTE CRS REs is performed for OFDM symbols for which LTE CRS REs are determined to overlap with the PDSCH allocation for the first cell, wherein LTE CRS rate matching for the PDSCH for the first cell is not performed for OFDM symbols for which LTE CRS REs are determined to not overlap with the PDSCH allocation for the first cell.

A further exemplary embodiment may include a method, comprising: performing, by a wireless device, any or all parts of the preceding examples.

Another exemplary embodiment may include a device, comprising: an antenna; a radio coupled to the antenna; and a processor operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
establish a wireless link with a Fifth Generation (5G) New Radio (NR) cell;
receive information indicating to perform long term evolution (LTE) cell specific reference signal (CRS) rate matching for a physical downlink shared channel (PDSCH) for the 5G NR cell for at least a first LTE carrier;
store one or more lookup tables for LTE CRS rate matching patterns;
select a first set of LTE CRS rate matching patterns associated with the first LTE carrier, wherein the first set of LTE CRS rate matching patterns includes four or fewer LTE CRS rate matching patterns, wherein the first set of LTE CRS rate matching patterns is selected from the one or more lookup tables for LTE CRS rate matching patterns; and
perform LTE CRS rate matching for the PDSCH for the 5G NR cell for the first LTE carrier using the first set of LTE CRS rate matching patterns.

2. The apparatus of claim 1, wherein the processor is further configured to cause the wireless device to:
determine a range of resource blocks (RBs) to which to apply each LTE CRS rate matching pattern of the selected set of LTE CRS rate matching patterns.

3. The apparatus of claim 2,
wherein a first LTE CRS rate matching pattern of the first set of LTE CRS rate matching patterns is applied in a range from a lowest frequency RB of the PDSCH that includes one or more resource elements (REs) that overlap with one or more LTE CRS REs for the first LTE carrier through an RB of the PDSCH adjacent to and lower in frequency than an RB of the PDSCH that overlaps with a DC subcarrier of the first LTE carrier,
wherein a second LTE CRS rate matching pattern of the first set of LTE CRS rate matching patterns is applied in a range from the lowest frequency RB of the PDSCH that includes one or more REs that overlap with one or more LTE CRS REs for the first LTE carrier through the RB of the PDSCH that overlaps with the DC subcarrier of the first LTE carrier,
wherein a third LTE CRS rate matching pattern of the first set of LTE CRS rate matching patterns is applied in a range from the RB of the PDSCH that overlaps with the DC subcarrier of the first LTE carrier through a highest frequency RB of the PDSCH that includes one or more REs that overlap with one or more LTE CRS REs for the first LTE carrier,
wherein a fourth LTE CRS rate matching pattern of the first set of LTE CRS rate matching patterns is applied in a range from an RB of the PDSCH adjacent to and higher in frequency than the RB of the PDSCH that overlaps with the DC subcarrier of the first LTE carrier through the highest frequency RB of the PDSCH that includes one or more REs that overlap with one or more LTE CRS REs for the first LTE carrier.

4. The apparatus of claim 1, wherein the processor is further configured to cause the wireless device to:
receive cell information for the 5G NR cell from the 5G NR cell; and
receive LTE carrier information for the first LTE carrier from the 5G NR cell,
wherein the first set of LTE CRS rate matching patterns is selected based at least in part on the cell information for the 5G NR cell and the LTE carrier information for the first LTE carrier.

5. The apparatus of claim 4, wherein the LTE carrier information includes at least an indication of a number of LTE CRS antenna ports for the first LTE carrier, wherein the processor is further configured to cause the wireless device to:
determine in which orthogonal frequency division multiplexing (OFDM) symbols for the 5G NR cell to perform LTE CRS rate matching for the PDSCH for the 5G NR cell for the first LTE carrier based at least in part on the number of LTE CRS antenna ports for the first LTE carrier.

6. The apparatus of claim 1, wherein the processor is further configured to cause the wireless device to:
receive information indicating to perform LTE CRS rate matching for the PDSCH for the 5G NR cell for at least a second LTE carrier;
select a second set of LTE CRS rate matching patterns associated with the second LTE carrier, wherein the second set of LTE CRS rate matching patterns includes four or fewer LTE CRS rate matching patterns; and
perform LTE CRS rate matching for the PDSCH for the 5G NR cell for the second LTE carrier using the second set of LTE CRS rate matching patterns.

7. A wireless device, comprising:
an antenna;
a radio operably coupled to the antenna; and
a processor operably coupled to the radio;
wherein the wireless device is configured to:
establish a wireless link with a first cell provided by a cellular base station, wherein the first cell operates according to Fifth Generation (5G) New Radio (NR);
receive information indicating to perform long term evolution (LTE) cell specific reference signal (CRS) rate matching for a physical downlink shared channel (PDSCH) for the first cell for at least a first LTE carrier;
store one or more lookup tables for LTE CRS rate matching patterns;
select a first set of LTE CRS rate matching patterns for performing LTE CRS rate matching for the PDSCH for the first cell for the first LTE carrier, wherein the first set of LTE CRS rate matching patterns includes four or fewer LTE CRS rate matching patterns, wherein the first set of LTE CRS rate matching patterns is selected from the one or more lookup tables for LTE CRS rate matching patterns; and
perform LTE CRS rate matching for the PDSCH for the first cell for the first LTE carrier using the first set of LTE CRS rate matching patterns.

8. The wireless device of claim 7, wherein the wireless device is further configured to:
determine a range of resource blocks to which to apply each LTE CRS rate matching pattern of the selected set of LTE CRS rate matching patterns.

9. The wireless device of claim 8,
wherein a range of resource blocks (RBs) to which to apply a first LTE CRS rate matching pattern of the first set of LTE CRS rate matching patterns extends between a lowest frequency RB of the PDSCH that includes one or more resource elements (REs) that overlap with one or more LTE CRS REs for the first LTE carrier and an RB of the PDSCH adjacent to and lower in frequency than an RB of the PDSCH that overlaps with a DC subcarrier of the first LTE carrier,
wherein a range of RBs to which to apply a second LTE CRS rate matching pattern of the first set of LTE CRS rate matching patterns extends between the lowest frequency RB of the PDSCH that includes one or more REs that overlap with one or more LTE CRS REs for the first LTE carrier and the RB of the PDSCH that overlaps with the DC subcarrier of the first LTE carrier,
wherein a range of RBs to which to apply a third LTE CRS rate matching pattern of the first set of LTE CRS rate matching patterns extends between the RB of the PDSCH that overlaps with the DC subcarrier of the first LTE carrier and the highest frequency RB of the PDSCH that includes one or more REs that overlap with one or more LTE CRS REs for the first LTE carrier,
wherein a range of RBs to which to apply a fourth LTE CRS rate matching pattern of the first set of LTE CRS rate matching patterns extends between an RB of the PDSCH adjacent to and higher in frequency than the RB of the PDSCH that overlaps with the DC subcarrier of the first LTE carrier and the highest frequency RB of the PDSCH that includes one or more REs that overlap with one or more LTE CRS REs for the first LTE carrier.

10. The wireless device of claim 7,
wherein the one or more lookup tables for LTE CRS rate matching patterns include at least:
a lookup table for LTE CRS rate matching patterns for 1 transmit (TX) antenna port LTE CRS configurations; and
a lookup table for LTE CRS rate matching patterns for more than 1 TX antenna port LTE CRS configurations.

11. The wireless device of claim 7, wherein the wireless device is further configured to:
receive cell information for the first cell; and
receive LTE carrier information for the first LTE carrier,
wherein the first set of LTE CRS rate matching patterns is selected based at least in part on the cell information for the first cell and the LTE carrier information for the first LTE carrier.

12. The wireless device of claim 7, wherein the wireless device is further configured to:
receive information indicating to perform LTE CRS rate matching for the PDSCH for the first cell for at least a second LTE carrier;
select a second set of LTE CRS rate matching patterns for performing LTE CRS rate matching for the PDSCH for the first cell for the second LTE carrier, wherein the second set of LTE CRS rate matching patterns includes four or fewer LTE CRS rate matching patterns; and
perform LTE CRS rate matching for the PDSCH for the first cell for the second LTE carrier using the second set of LTE CRS rate matching patterns.

13. A method, comprising:
by a wireless device:
establishing a wireless link with a first cell provided by a cellular base station, wherein the first cell operates according to fifth generation (5G) new radio (NR);
receiving information indicating to perform long term evolution (LTE) cell specific reference signal (CRS) rate matching for a physical downlink shared channel (PDSCH) for the first cell;
determining which resource elements (REs) of a PDSCH allocation for the first cell overlap with LTE CRS RES;
storing a RE-level representation of which REs of the PDSCH allocation for the first cell overlap with LTE CRS REs; and
performing LTE CRS rate matching for the PDSCH for the first cell using the RE-level representation of which REs of the PDSCH allocation for the first cell overlap with LTE CRS REs.

14. The method of claim 13,
wherein the RE-level representation of which REs of the PDSCH allocation for the first cell overlap with LTE CRS REs includes resource block index and subcarrier index information for each of a start of a frequency range below a LTE DC subcarrier, an end of the frequency range below the LTE DC subcarrier, a start of a frequency range above the LTE DC subcarrier, and an end of the frequency range above the LTE DC subcarrier.

15. The method of claim 14, wherein the method further comprises:
receiving LTE carrier information from the first cell, wherein the LTE carrier information received from the first cell indicates at least a location of the LTE DC subcarrier, a system bandwidth of the LTE carrier, and a LTE CRS frequency shift for the LTE carrier,
wherein the resource block index and subcarrier index information for each of the start of the frequency range below the LTE DC subcarrier, the end of the frequency range below the LTE DC subcarrier, the start of the frequency range above the LTE DC subcarrier, and the end of the frequency range above the LTE DC subcarrier are determined based at least in part on the location of the LTE DC subcarrier, the system bandwidth of the LTE carrier, and the LTE CRS frequency shift for the LTE carrier.

16. The method of claim 14,
wherein the RE-level representation of which REs of the PDSCH allocation for the first cell overlap with LTE CRS REs further includes an indication of a RE step size for LTE CRS REs in the frequency range below the LTE DC subcarrier and in the frequency range above the LTE DC subcarrier.

17. The method of claim 16, wherein the method further comprises:
receiving LTE carrier information from the first cell, wherein the LTE carrier information received from the first cell indicates at least a number of LTE CRS antenna ports for the LTE carrier,
wherein the RE step size for LTE CRS REs in the frequency range below the LTE DC subcarrier and in the frequency range above the LTE DC subcarrier is determined based at least in part on the number of LTE CRS antenna ports for the LTE carrier.

18. The method of claim 13, wherein the method further comprises:
receiving LTE carrier information from the first cell, wherein the LTE carrier information received from the first cell indicates at least a number of LTE CRS antenna ports for the LTE carrier; and
determining in which orthogonal frequency division multiplexing (OFDM) symbols for the first cell LTE CRS REs overlap with the PDSCH allocation for the first cell based at least in part on the number of LTE CRS antenna ports for the LTE carrier,
wherein the LTE CRS rate matching for the PDSCH for the first cell using the RE-level representation of which REs of the PDSCH allocation for the first cell overlap with LTE CRS RES is performed for OFDM symbols for which LTE CRS REs are determined to overlap with the PDSCH allocation for the first cell, wherein LTE CRS rate matching for the PDSCH for the first cell is not performed for OFDM symbols for which LTE CRS REs are determined to not overlap with the PDSCH allocation for the first cell.

* * * * *